US006304687B1

United States Patent
Inoue et al.

(10) Patent No.: US 6,304,687 B1
(45) Date of Patent: Oct. 16, 2001

(54) OPTICAL WAVEGUIDE CIRCUIT, ITS MANUFACTURING METHOD AND OPTICAL WAVEGUIDE MODULE HAVING THE OPTICAL WAVEGUIDE CIRCUIT

(75) Inventors: Yasuyuki Inoue; Akimasa Kaneko; Hiroshi Takahashi, all of Mito; Fumiaki Hanawa, Hirachiota; Kuninori Hattori, Yokosuka; Kenji Yokoyama, Tsuchiura; Senichi Suzuki, Mito; Shin Sumida, Tsukuba; Katsunari Okamoto; Motohaya Ishii, both of Mito; Hiroaki Yamada, Hitachinaka; Takashi Yoshida; Koichi Arishima, both of Mito; Fumihiro Ebisawa, Ibaraki-ken; Motohiro Nakahara, Mito, all of (JP)

(73) Assignees: Nippon Telegraph and Telephone Corporation; NTT Electronics Corporation, both of Tokyo (JP)

( * ) Notice: Subject to any disclaimer, the term of this patent is extended or adjusted under 35 U.S.C. 154(b) by 0 days.

(21) Appl. No.: 09/171,020
(22) PCT Filed: Feb. 16, 1998
(86) PCT No.: PCT/JP98/00626
 § 371 Date: Oct. 14, 1998
 § 102(e) Date: Oct. 14, 1998
(87) PCT Pub. No.: WO98/36299
 PCT Pub. Date: Aug. 20, 1998

(30) Foreign Application Priority Data

Feb. 14, 1997 (JP) ...................................................... 9-030251
May 29, 1997 (JP) ................................................... 9-140231

(51) Int. Cl.[7] ...................................................... G02B 6/12
(52) U.S. Cl. ............................... 385/14; 385/31; 385/37; 385/46
(58) Field of Search .................................... 385/14, 37, 15, 385/17, 18, 24, 31, 42, 43, 46, 131, 132; 359/113, 114, 110, 124, 125, 345

(56) References Cited

U.S. PATENT DOCUMENTS 5,123,070 * 6/1992 Bradley .................................. 385/37
5,546,483 * 8/1996 Inoue et al. ............................ 385/14

FOREIGN PATENT DOCUMENTS 8-334639 12/1996 (JP).

OTHER PUBLICATIONS

Takahashi, et al., "Arrayed–Waveguide Grating For Wavelength Division Multi/Demultiplexer With Nanometre Resolution", Electronics Letters, Jan. 1990, vol. 26, No. 2, pp. 87–88.
Kokubun, et al., "Temperature–Independent Narrow–Band Filter By Athermal Waveguide", 22nd ECOC, 1996, pp. 143–146.

* cited by examiner

Primary Examiner—Frank G. Font
Assistant Examiner—Michael P Mooney
(74) Attorney, Agent, or Firm—Pillsbury Winthrop LLP

(57) ABSTRACT

In a light waveguide circuit including a plurality of waveguides having different length, a material (10) having a temperature coefficient of a refractive index including a symbol different from that of a temperature coefficient of an effective refractive index of the waveguide (4) is charged into a groove (12) formed by removing the upper clad and the core from the waveguide (4), or a groove (12) formed by removing the upper clad, the core and the lower clad from the waveguide (4). A difference in length of the removed portions between adjacent waveguides is proportional to a difference in length of the waveguides which were not removed and remained.

28 Claims, 18 Drawing Sheets

OPTICAL WAVEGUIDE CIRCUIT, ITS MANUFACTURING METHOD AND OPTICAL WAVEGUIDE MODULE HAVING THE OPTICAL WAVEGUIDE CIRCUIT

This application is the national phase of international application PCT/JP98/00626 filed Feb. 16, 1998 which designated the U.S.

1. Technical Field

The present invention relates to a light waveguide circuit used in a field of an optical communication or an optical information processing, a producing method thereof and a light waveguide circuit module having such a lightwaveguide circuit, and more particularly, to a waveguide type optical element whose optical characteristic does not depend on a temperature, and more specifically, a lightwaveguide circuit such as a lightwavelength grating multiplexer constituted by a waveguide formed on a planar substrate and optical characteristic thereof does not depend on a temperature.

2. Background Art

Recently, studies and developments have actively been made for planar lightwave circuits (PLC) comprising quartz glass lightwaveguide formed on a silicone substrate.

In such a planar lightwave circuit, a lightwavelength grating multiplexing function is realized using a light interference of multiple beams or two beams, such as arrayed-waveguide grating multiplexer (AWG) or Mach Zehnder interferometer (MZI).

The arrayed-waveguide grating multiplexer has a feature that bind and separation of waves of wavelength multiple light can collectively be carried out by interference of a plurality of lights which propagate tens to hundreds of juxtaposed arrayed-waveguides having lengths which are different from one other by n×ΔL.

Details are described in "H. Takahashi et al., Arrayed-Waveguide Grating for Wavelength Division Multi/Demultiplexer With Nanometre Resolution, Electron. Lett., vol. 26, no. 2, pp. 87–88, 1990".

FIG. 1 shows a circuit diagram of the conventional arrayed-waveguide grating multiplexer, FIG. 2 shows an enlarged sectional view taken along the line a—a in FIG. 1, and FIG. 3 shows one example of a transmittance spectrum from the central input port to the central output port.

In FIGS. 1 and 2, an input waveguide 2, a first slab waveguide 3, an arrayed-waveguide 4, a second slab waveguide 5, an output waveguide 6, a waveguide core 7 and a clad 8 are mounted to an Si substrate 1.

It is apparent from FIG. 3 that only a particular wavelength is transmitted and other lights are prevented from being transmitted.

The transmission band also has a characteristic of a narrow-band of about 1 nm. A wavelength λ c in which the transmission loss becomes minimum is given by the following equation (1):

$$\lambda c = n \times \Delta L / m \qquad (1)$$

wherein, the character m denotes a diffraction degree, the character n denotes an effective refractive index of waveguide. ΔL is a difference of length between adjacent arrayed-waveguides and more specifically, is a value of about 10–100 μm.

As shown in the equation (1), λc is determined by a difference of light path length of waveguides (the product of effective refractive index multiplied by length), i.e., n×ΔL, but the difference of light path length depends on a temperature, λc depends on a temperature accordingly.

FIG. 4 shows transmittance spectrums at temperatures of 25° C., 50° C. and 75° C. In addition, FIG. 5 shows temperature dependence of λ c.

As can be seen from these drawings, a variation width of λc with respect to temperature change of 50° C. is about 0.5 mm.

Incidentally, it is known that the optical path length temperature coefficient $(1/\Delta L) \times d\ (n \cdot \Delta L)/dT$ of quartz-based waveguide is about $1 \times 10^{-5}$ (1/° C.), and a calculated value of the temperature coefficient dλc/dT of λc is about 0.01 (nm/°C.) which corresponds to a result of FIG. 5. Therefore, the arrayed-waveguide grating multiplexer is used in a environment in which the temperature change is about 10°C. to 60°C., a precise temperature control is necessary.

FIG. 6 shows a Mach Zehnder interferometer type lightwaveguide photo-multiplexer. An input waveguide 102, a directional coupler 103 and 106, two arm waveguides 104 and 105 are formed on a substrate 101.

A wave-relativity characteristic of the circuit shown in FIG. 6 is given by the following equation (2):

$$J(\lambda) = \frac{1}{2} \times \{1 + \cos[2\pi n \Delta L / \lambda]\} \qquad (2)$$

wherein the symbol λ denotes a wavelength, the character n denotes an effective refractive index, and ΔL is a difference of length of two arm waveguides.

From the equation (2), a wavelength λ c in which the transmission ratio becomes maximum is given by the following equation (3):

$$\lambda c = n \times \Delta L / k \qquad (3)$$

wherein the character k is an integer.

As apparent from the fact that the equation (3) has the same style as the equation (1), λc of MZI has the same temperature dependence as that of AWG.

Therefore, when the arrayed-waveguide grating multiplexer or the Mach Zehnder interferometer type lightwaveguide photo-multiplexer is used, it is necessary to keep the temperature of lightwaveguide circuit constant using Peltier element or heater.

Further, a power source, control apparatus or the like is required for operating the Peltier element or heater, which increase a volume and price of the entire lightwaveguide grating multiplexer.

For this reason, it had been required to remove the temperature dependency of the lightwaveguide circuit itself, and to unnecessitate the temperature control.

Conventionally, as a method to lower the temperature dependency of the lightwaveguide circuit, there is a structure that the waveguide is formed at its one portion with a core made of material having a different temperature coefficient of a refractive index, thereby keeping n·ΔL constant even if the temperature is changed, as disclosed in Jpn. Pat. Appln. KOKAI Publication No.8-5834.

However, in this method, two kinds of cores having different materials are intermingled on the same substrate, which complicates the structure and thus, it is not manufactured easily.

As another method, it has been reported a method in which a polymeric material is used as a clad layer (for example, Y. Kokubun et al, "Temperature independent Narrow-Band Filter by Athermal Waveguide", ECOC'96, WeD. 1.5).

However, in this method, in order to keep the light path length constant, temperature change having a great refractive index of clad material is utilized. Therefore, if the temperature is changed, a difference of refractive index of the core and the clad is changed, and if worst comes worst, the waveguide may not introduce light and therefore, this method can not keep up with wide change of environment temperature.

It is an object of the present invention to realize a simple structure which can reduce the temperature dependency of the wavelength characteristic and which can easily be manufactured, and to provide a lightwaveguide circuit, a producing method thereof, and a lightwaveguide circuit module having the lightwaveguide circuit.

DISCLOSURE OF INVENTION

To achieve the above object, according to a conception 1 of the present invention there is provided, in a lightwaveguide circuit including a plurality of waveguides of different optical path lengths, wherein, a core and an upper clad, a material having a temperature coefficient including a refractive index including a symbol different from that of a temperature coefficient of an effective refractive index of the waveguide is ("temperature compensating material" hereinafter) charged into at least one of a groove formed by removing an upper clad and a core from the waveguide, and a groove formed by removing the upper clad, the core and the lower clad from the waveguide, and a difference in length of the removed portions between adjacent waveguides is proportional to a difference in length of the waveguides which was not removed and remained.

According to a conception 2 of the present invention, in a waveguide comprising quartz glass, a temperature coefficient of an effective refractive index of an waveguide has a positive value (about $1\times10^{-5}$) and therefore, a negative temperature coefficient of the refractive index is used as a temperature compensating material.

According to a conception 3 of the present invention, a beam collimator waveguide or a lense is formed in front and rear of each of the portion in which the upper clad and the core are removed and the upper clad, the core and the lower clad are removed.

According to a conception 4 of the present invention, the plurality of waveguides comprise arrayed-waveguides which sequentially increase length by a predetermined length, the arrayed-waveguides are connected at their opposite ends to slab waveguides, a groove crossing the arrayed-waveguides and having sequentially increasing width is formed in intermediate portions of the arrayed-waveguides, and temperature compensating material is charged in the groove.

According to a conception 5 of the present invention, the plurality of waveguides comprise an arrayed-waveguides which sequentially increase length by a predetermined length, the arrayed-waveguides are connected at their opposite ends to optical branching slab waveguides, a groove having a sequentially increasing width is formed in the slab-waveguide, and a temperature compensating material is charged in the grooves.

According to a conception 6 of the present invention, the plurality of waveguides comprise two arm waveguides having different lengths, the arm waveguides are connected at their opposite ends with an optical branching directional coupler, is formed a groove in longer one of the arm waveguide, and a temperature compensating material is charged in the groove.

According to a conception 7 of the present invention, an absolute value of a temperature coefficient of a refractive index of the temperature compensating material is equal to or more than 20 times of a temperature coefficient of an effective refractive index of the waveguide.

According to a conception 8 of the present invention, the groove crosses the arrayed-waveguide or the arm waveguide at an angle of 80 to 85 degrees.

According to a conception 9 of the present invention, the groove are provided plurally.

According to a conception 10 of the present invention, at least two or more of the plurality of grooves are connected to one another.

According to a conception 11 of the present invention, an angle of the groove is rounded.

According to a conception 12 of the present invention, the temperature compensating material is polysiloxane or a cross-linker of polysiloxane.

According to a conception 13 of the present invention, the temperature compensating material includes polyolefin providing at its terminal end with at least one of OH group, thiol group, carbonyl group and halogen group.

According to a conception 14 of the present invention, the groove is formed in a region defined by the lightwaveguide, and the groove and the temperature compensating material charged into the groove are airtightly sealed by a lid disposed on a surface of the lightwaveguide.

According to a conception 15 of the present invention, instead of the lid, the groove and the temperature compensating material charged into the groove are covered with a temperature compensating material which is different from the temperature compensating material charged into the groove.

According to a conception 16 of the present invention, an optical fiber for introducing an input light is connected to a predetermined position of an end portion of the slab waveguide.

According to a conception 17 of the present invention, separated two lightwaveguide circuits are properly connected on a straight line crossing at least one of the slab waveguides.

According to a conception 18 of the present invention, a boundary line between the connected two lightwaveguide circuits is passed through a first slab waveguide and is substantially perpendicular to a line connecting an input waveguide and the arrayed-waveguide, or is passed through a second slab waveguide and is substantially perpendicular to a line connecting an output waveguide and the arrayed-waveguide.

According to a conception 19 of the present invention, there is provided a producing method of a lightwaveguide circuit according to any one of conception 16 or 17, wherein when the slab waveguide and an input fiber are connected to each other, or the slab waveguides are connected to each other, a light having service wavelength is transmitted to determine a relative position of both the two members such that a loss of the light becomes minimum, thereby adhering and fixing the two members.

According to a conception 20 of the present invention, there is provided a producing method of a lightwaveguide circuit according to any one conception 16 or 17, wherein when the slab waveguide and an input fiber are connected to each other, or the slab waveguides are connected to each other, a light having a wide band wavelength spectrum is transmitted to make an alignment in a direction perpendicular to a substrate such that a loss of the light becomes minimum, and to make an alignment in a direction parallel to the substrate such that becomes a predetermined value and finally, connected and fixed.

According to a conception 21 of the present invention, in a lightwaveguide circuit module comprising one or a plurality of input fibers and one or a plurality of output fibers, as well as a lightwaveguide circuit, a boot, a case and a buffer member according to any one of claims 1 to 18, wherein the input and output fibers are connected and fixed to an end surface of the lightwaveguide circuit, the input and output fibers are fixed to the boot, the boot is fixed to the case, and the buffer material is charged between the case and the lightwaveguide circuit.

BRIEF DESCRIPTION OF DRAWINGS

FIGS. 37A and 37B are views showing a temperature independent arrayed-waveguide grating multiplexer having a beam collimator waveguide according to a sixteenth embodiment, in which FIG. 37A is a plane view and FIG. 37B is an enlarged plane view in the vicinity of a groove; and FIGS. 38A and 38B are views showing a temperature independent arrayed-waveguide grating multiplexer having a collimator lens according to a seventeenth embodiment, in which FIG. 38A is a plane view and FIG. 38B is an enlarged plane view in the vicinity of a groove.

BEST MODE OF CARRYING OUT THE INVENTION

Before preferred embodiments are described, a principle of the present invention will be described in detail using a waveguide circuit shown in FIG. 7.

Figure 7:
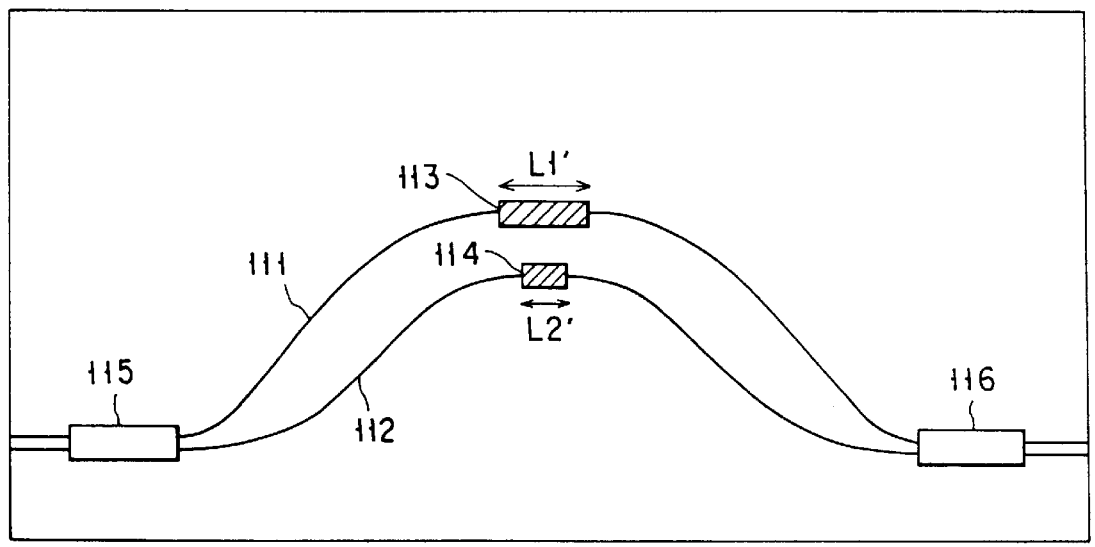
FIG. 7 is a view showing a structure of a lightwaveguide circuit for showing a basic principle of the present invention.

FIG. 7 shows an example of a lightwaveguide circuit having a plurality of waveguides. Waveguides 111 and 112 are respectively provided at their sections 113 and 114 with materials (temperature compensating materials) which have temperature coefficients of refractive index including different symbol from the waveguides 111 and 112. The waveguides 111 and 112 are branched and joined at branch/join sections 115 and 116.

Here, a temperature coefficient of effective refractive index of the waveguide is denoted by dn1/dT, a temperature coefficient of refractive index of the temperature compensating material is denoted by dn2/dT, a length of the waveguide 111 (excluding the groove 113) is denoted by L1, a length of the waveguide 112 (excluding the groove 114) is denoted by L2, a length of the groove 113 is denoted by L1', and a length of the groove 114 is denoted by L2'.

In order that a difference in optical phases guided in the two waveguides 111 and 112 are not varied with respect to temperature change (which will be called as temperature-independence hereinafter), it is necessary that a difference of optical path lengths of the two waveguides are not varied with respect to temperature, that is, it is necessary that the following equation (4) is established;

$$L1\lambda(dn1/dT)+L1'\lambda(dn2/dT)=L2\times(dn1/dT)+L2'\lambda(dn2/dT) \quad (4)$$

The above equation (4) is transformed, thereby providing the following equation (5):

$$(L1-L2)\times(dn1/dT)=(L2'-L1')\times(dn2/dT) \quad (5)$$

Here, if L1>L2, L1'<L2' is established when (dn1/dT) and (dn2/dT) have the same symbols, and L1'>L2' is established when (dn1/dT) and (dn2/dT) have different symbols. That is, when the temperature coefficient of the refractive index of the waveguide and the temperature coefficient of the refractive index of the temperature compensating material have the same symbols, a short groove is formed in a long waveguide, and a long groove is formed in a short waveguide and therefore, the lightwaveguide circuit becomes long.

Whereas, when the above-described two temperature coefficients have different symbols, L1'>L2', a long groove is formed in the long waveguide, and a short groove is formed in the short waveguide and therefore, the lightwaveguide circuit can be made compact.

Further, as can be seen from the equation (5), it is important that length of each of the groove is designed such that a difference of length of the grooves is proportional to a difference of length of the waveguides, and if this condition is satisfied, L2' may be equal to 0.

As the arrayed-waveguide grating multiplexer, when a large number of waveguides which are sequentially elongated at a constant length are provided, because it is necessary to satisfy the equation (5) between adjacent waveguides, grooves which are sequentially elongated at a constant length are provided in accordance with the waveguides which are elongated sequentially.

The groove does not have a waveguide structure and therefore, optical strength distribution is spread due to diffraction, a loss is generated. Therefore, as a width of the groove is smaller, the loss is smaller. A length of the groove is increased by (L2'-L1') in accordance with the equation (5). Therefore, if a material having a larger absolute value of dn2/dT, the length of the groove can be made shorter.

Examples of materials as a temperature compensating material are (monomer material such as) aromatic compounds such as benzene and toluene; cyclic hydrocarbon compound such as cyclohexane; linear hydrocarbon compound such as isooctane, n-hexan, n-octane, n-decane and n-hexadecane; chloride such as carbon tetrachloride; sulfide such as carbon disulfide; and ketone such as methylethyl ketone; and Polymeric material such as: polyolefin such as polyethylene, polypropylene and polybutylene; polydiene such as polybutadiene and natural rubber; vinyl polymer such as polystyrene, polyvinyl acetate, polymethyl vinyl ether, polyethyl vinyl ether, polyacrylic acid, polyacrylic acid methyl, polymethacrylate, polymethyl methacrylate, polymethyl butyl, polymethacrylate hexyl, and polymethacrylate dodecyl; linear olefin based polyether; polyphenylene oxide (PPO), blend of linear olefin based polyether and its polymer; polyether sufone (PES) in which ether group and sulfone group are mixed; polyether ketone (PEK) in which ether group and carbonyl group are mixed; polyether such as polyphenylene sulfide (PPS) having thio-ether group and polysulfone (PSO); blend of polyether and its copolymer; polyolefin provided at its terminal end with at least one of substituents such as OH group, thiol group, carbonyl group and halogen group, e.g., polyoxide such as polyethylene oxid and polypropylene oxide or polybutyl isocyanate and polyvinylidene fluoride such as HO—(C—C—C—C—)n—(C—C(C—C—)m)—OH; and epoxy resin, and cross-linker using origomer and hardener.

Further, a mixture of two or more above-described materials may be used.

Furthermore, polysiloxane or cross-linker of polysiloxane (which is generally called as silicone resin) may be used. Each of these materials has not only a greater temperature coefficient of refractive index, but has excellent water-resistance and long-term stability, and is most suitable as the temperature compensating material of the present invention.

Here, a general formula of polysiloxane is represented as follows:

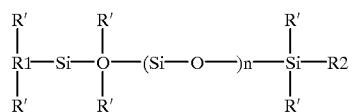

In this formula, the characters R1 and R2 denote terminal groups comprising any of: hydrogen, alkyl group, hydroxyl group, vinyl group, amino group, amino alkyl group, epoxy group, alkylepoxy group, alkoxyepoxy group, methacrylate group, chlor group, and acetoxy group.

The character R' denotes a side chain comprising any of: hydrogen, alkyl group, alkoxy group, hydroxyl group, vinyl group, amino group, amino alkyl group, epoxy group, methacrylate group, chlor group, acetoxy group, phenyl group, phloroalkyl group, alkylphenyl group and cyclohexane group. It is possible to mount a single polysiloxan, or a mixture of a plurality kinds of polysiloxan.

A cross-linker of polysiloxane is provided by reacting, with a polysiloxane, a reactive polysiloxane whose terminal end has vinyl group, hydrogen group, silanol group, amino group, epoxy group and carbinol group, under existence of platinum catalyst, radical, acid, base and the like. Other example of the cross-linker of polysiloxane to be mounted are: polysiloxane which is softened into gel state, composite in which monomer polysiloxane is mixed in gel polysiloxane, and composite in which polymeric polysiloxane and monomer polysiloxane are mixed and cross-linked.

In accordance with the principle of the present invention as described above, preferred embodiments of the invention will be described below. In each of the embodiments, the above-described silicone resin is used as the temperature compensating material, the same effect can be obtained even if the above described other materials are used.

First Embodiment

Figure 1:
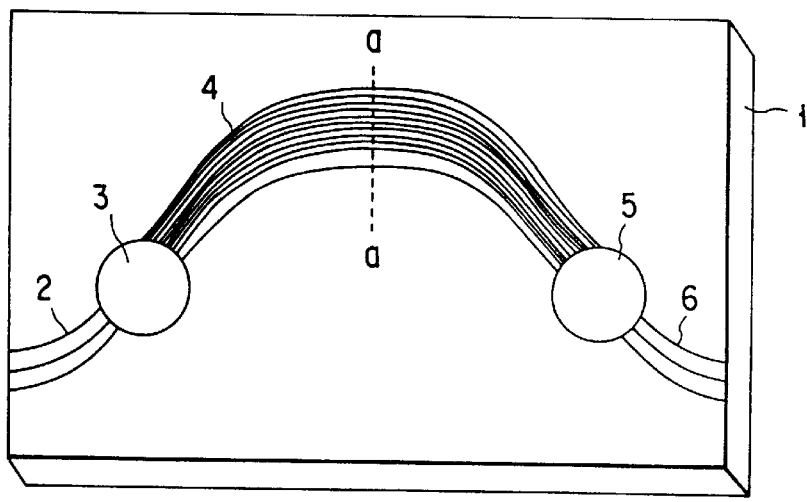
FIG. 1 is a view showing a structure of a conventional arrayed-waveguide grating multiplexer.
Figure 2:
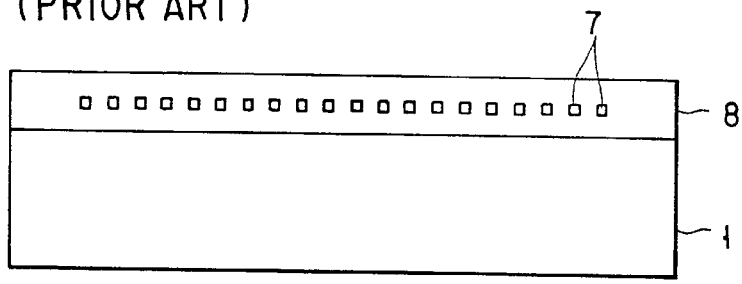
FIG. 2 is an enlarged sectional view taken along the line a—a in FIG. 1.
Figure 8:
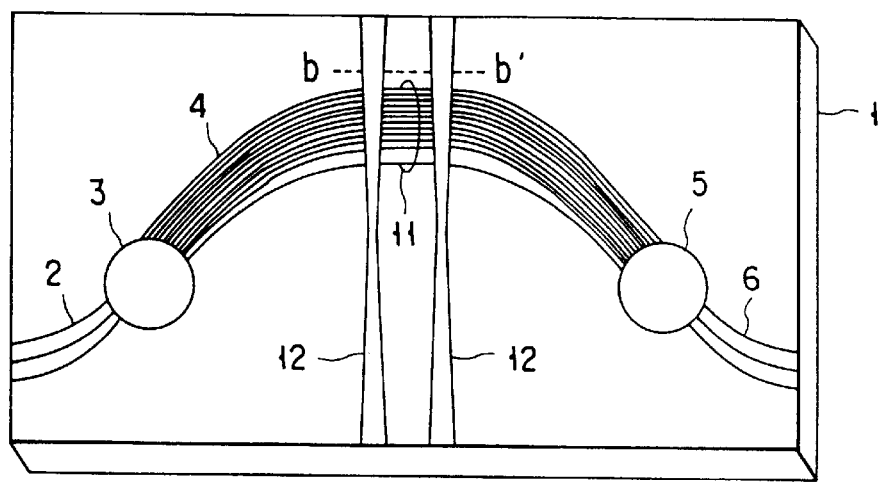
FIG. 8 is a view showing a structure of a temperature independent arrayed-waveguide grating multiplexer (AWG) according to a first embodiment.
Figure 9:
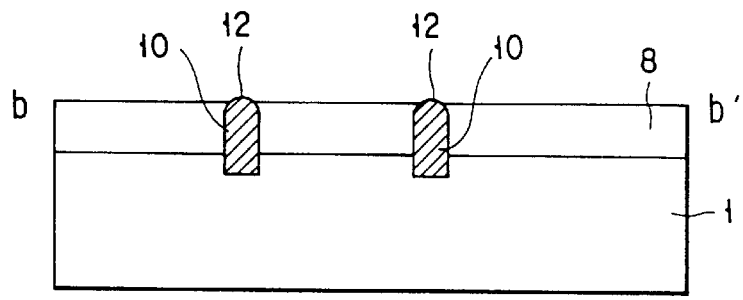
FIG. 9 is an enlarged sectional view taken along the line b–b' in FIG. 8.

FIG. 8 shows a temperature independent arrayed-waveguide grating multiplexer according to a first embodiment of the present invention, and FIG. 9 shows an enlarged sectional view taken along the line b–b' in FIG. 8. An arrayed-waveguide 4 shown in FIG. 8 of the conventional arrayed-waveguide grating multiplexer (FIG. 1) is provided at its central portion with a straight waveguide portion 11 for forming a groove. Si substrate 1, input waveguide 2, a first slab waveguide 3, a second slab waveguide 5, output waveguide 6 and a groove 12 are provided.

Figure 10:
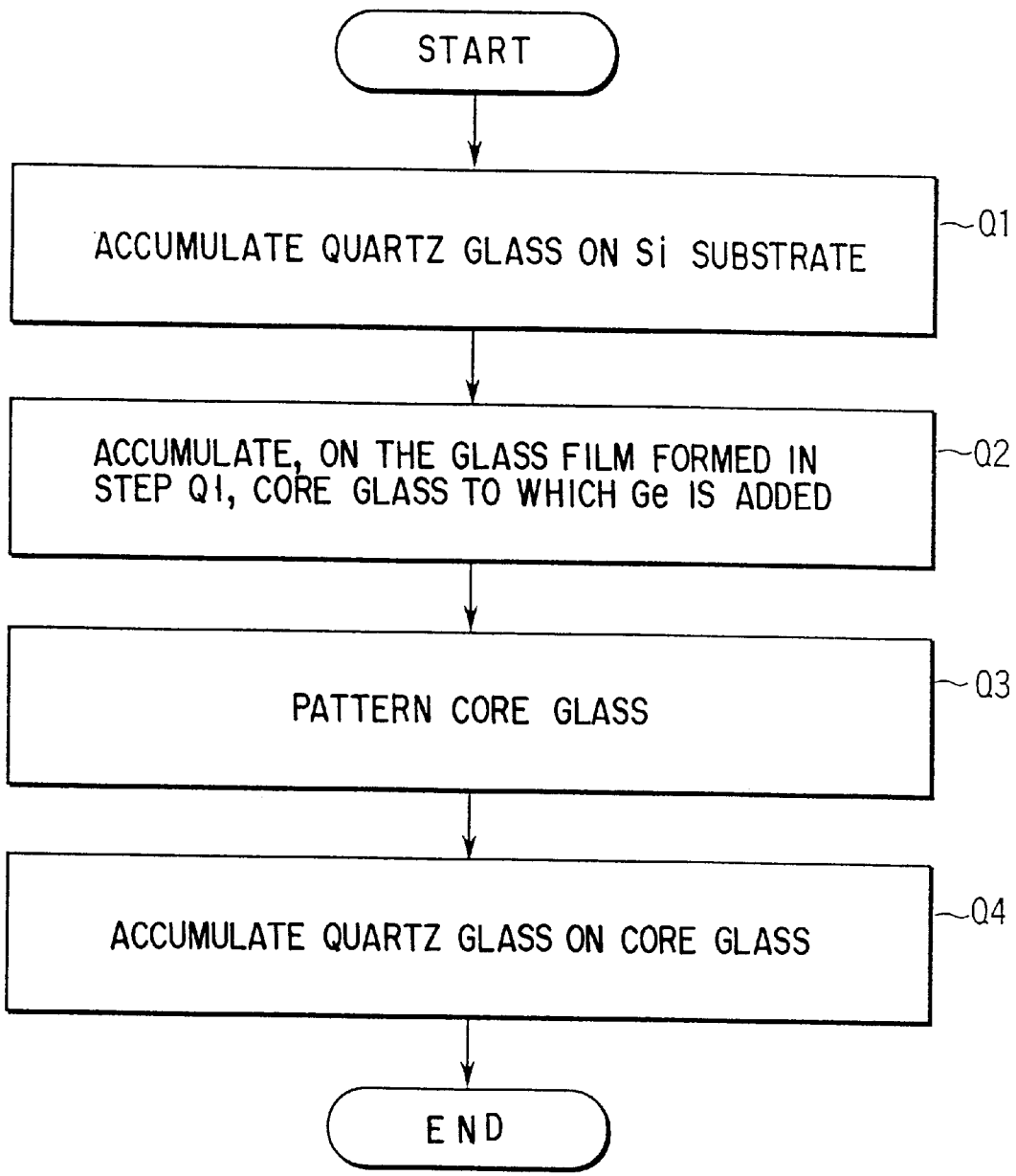
FIG. 10 is a flowchart showing manufacturing method of waveguide circuit of the present invention.

A method for producing the waveguide of the invention will be described with reference to FIG. 10.

Step Q1: A quartz glass is accumulated on the Si substrate 1 in an amount of 30 μm by flame-accumulating process, and is transparentized in an electric furnace.

Step Q2: Then, a core glass in which Ge is added is accumulated on the glass film which is accumulated in step Q1 in an amount of 7 μm by flame-accumulating process, and is transparentized in the electric furnace.

Step Q3: Then, the core glass is patterned by photolithography and reactive etching.

Step Q4: Lastly, the quartz glass is accumulated in an amount of 30 μm, and is transparentized.

With this series of operations, an embeded quartz waveguide having a small propagation loss is produced.

Parameters of the arrayed-waveguide grating multiplexer are set as follows: a difference in length of adjacent arrayed-waveguides is 50 μm, the number of the arrayed-waveguides 4 is 100, and a difference of specific refractive index of waveguide is 0.45%. With this design, AWG of wavelength channel interval of 1.6 nm, 8 inputs and 8 outputs is realized.

After the waveguide is produced, two wedge-shaped grooves 12 were formed in the straight waveguide portion 11 by a dicing saw. Each of these grooves 12 was formed by rotating a sample little by little and lap-cutting the grooves by the dicing saw. The groove 12 was formed such that a width thereof corresponding to a waveguide having the shortest optical path length of the arrayed-waveguide 4 was narrow, and a width thereof corresponding to a waveguide having the longest optical path length was wide. More specifically, the groove 12 was formed such that a length of the waveguide which was to be cut by the groove was increased by 0.6 μm each. At this time, the narrowest width was 20 mm, was the widest width was 80 μm. A depth of the groove was 100 μm. Lastly, a silicone resin was dropped into the groove 12, heated and cured. The optical path length temperature coefficient of this silicone resin was about −40 times of that of a quartz waveguide, and was −4×10$^{-4}$.

Figure 3:
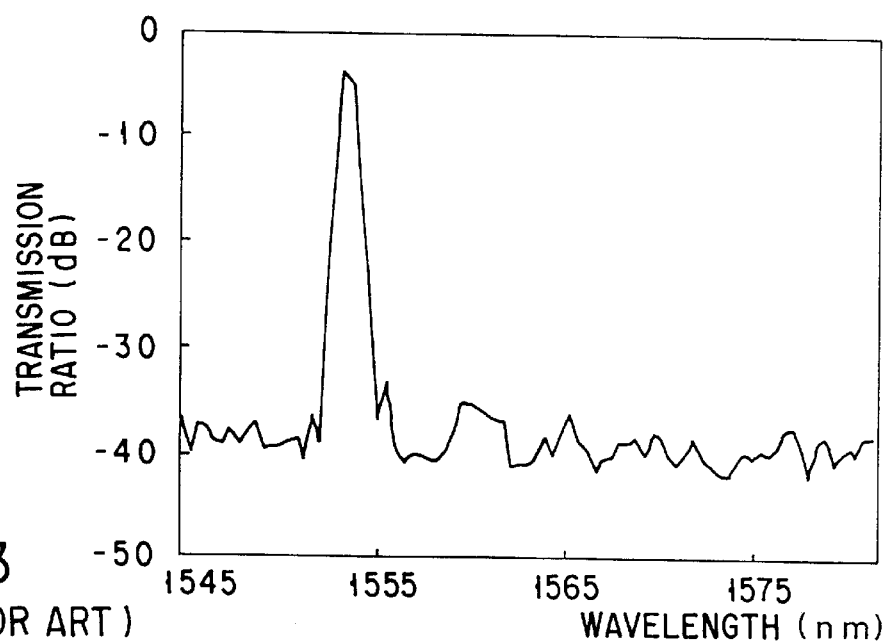
FIG. 3 is a graph showing one example of a transmittance spectrum of the conventional arrayed-waveguide grating multiplexer.
Figure 4:
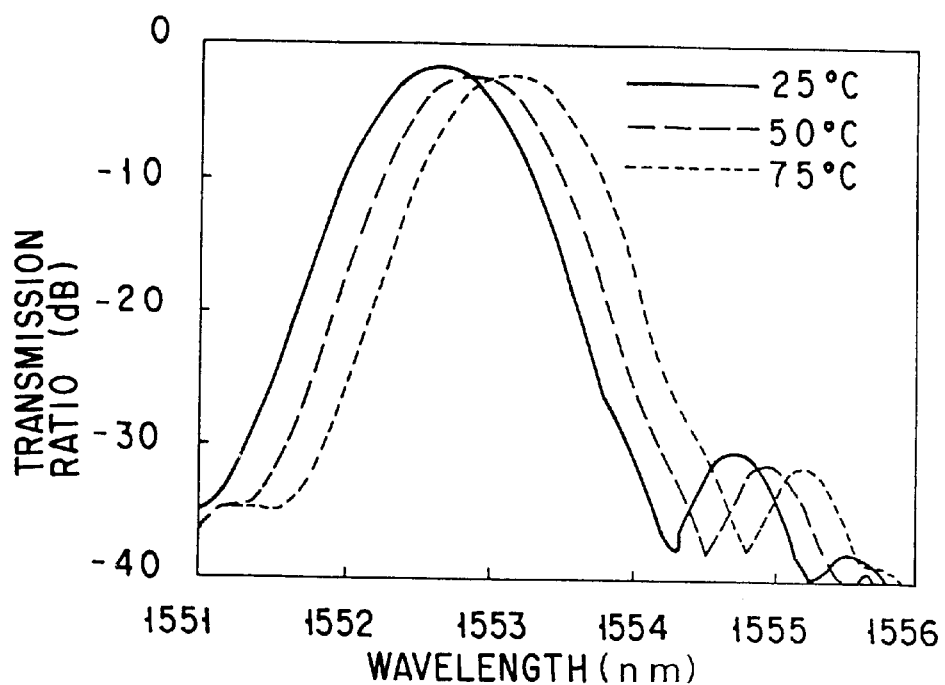
FIG. 4 is a graph showing a temperature dependence of a transmittance spectrum of the conventional arrayed-waveguide grating multiplexer.
Figure 5:
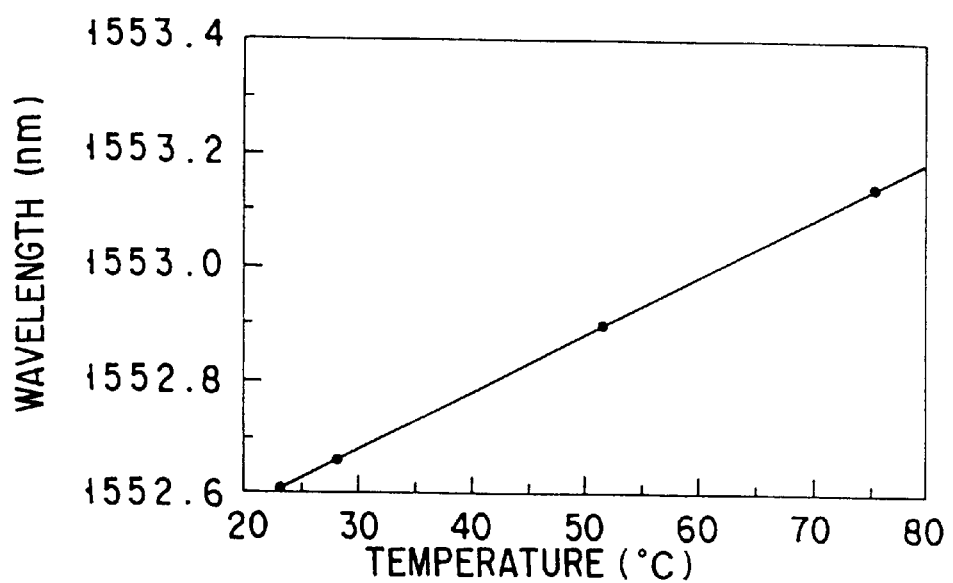
FIG. 5 is a graph showing temperature dependence of a wavelength in which the transmittance of the conventional arrayed-waveguide grating multiplexer becomes maximum.
Figure 6:
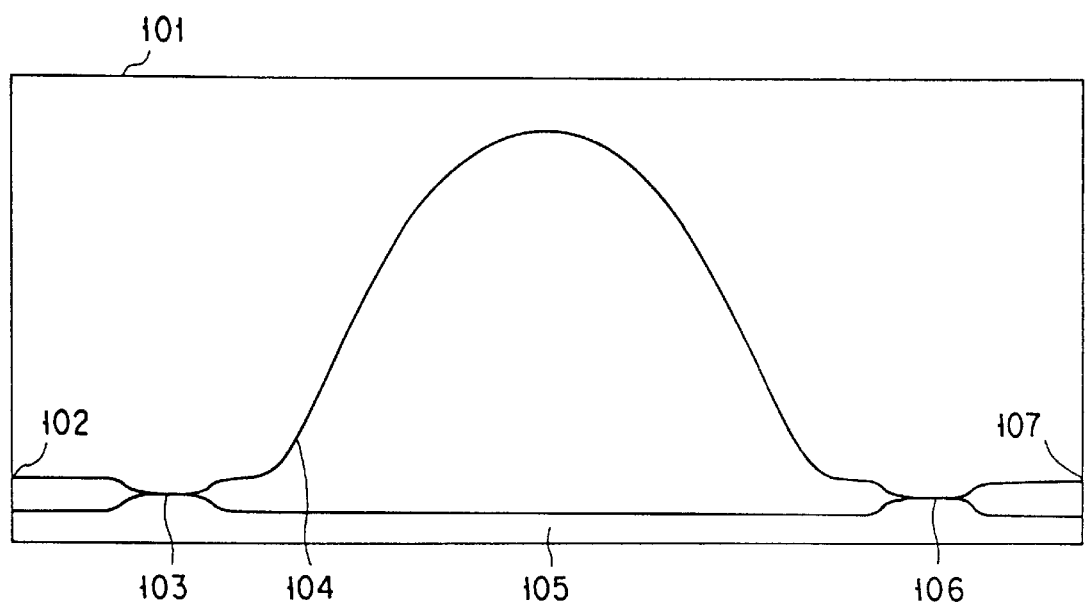
FIG. 6 is a view showing a structure of a conventional waveguide circuit Mach Zehnder interferometer.
Figure 11:
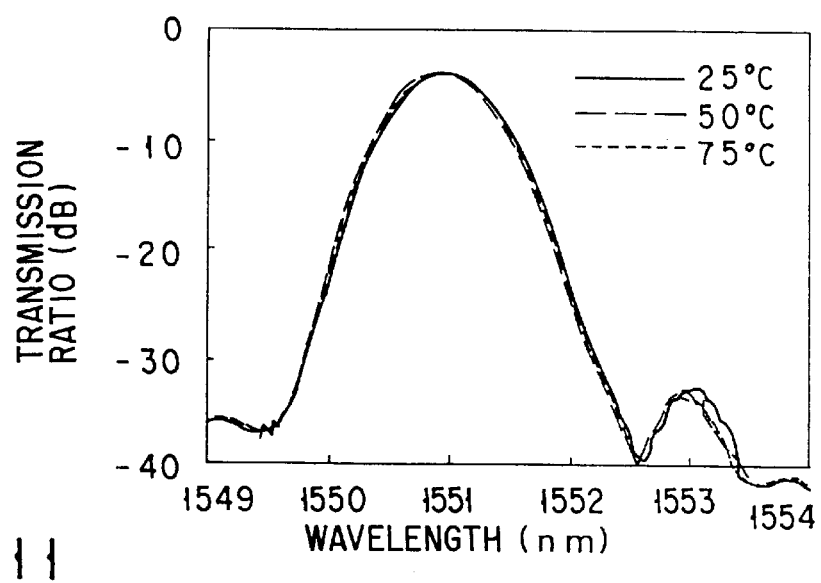
FIG. 11 is a graph showing a temperature dependence of a transmittance spectrum of the temperature independent arrayed-waveguide grating multiplexer according to the first embodiment.
Figure 12:
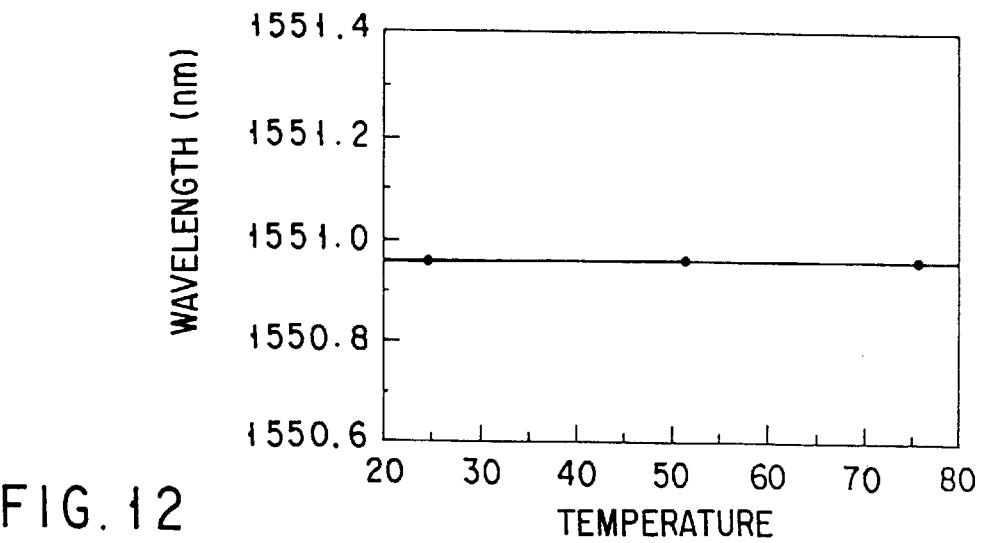
FIG. 12 is a graph showing a temperature dependence of a central wavelength of the temperature independent arrayed-waveguide grating multiplexer according to the first embodiment.

A temperature dependence of a transmittance spectrum of the produced arrayed-waveguide grating multiplexer is shown in FIG. 11. It can be seen that the spectrum is not varied almost at all in a temperature range of 25° C. to 75° C. A temperature dependency of the transmission wavelength is shown in FIG. 12. If FIGS. 11 and 3 are compared, it can be found that transmission ratio in the transmission wavelength is lower by about 2 dB. This is due to a radiation loss in the groove 12. From FIG. 12, it can be seen that a variation of the transmission wavelength in the temperature range of 0° C. to 80° C. is 0.05 nm or less. This value is sufficiently small as compared with the channel interval 1.6 nm and thus, it is unnecessary to control the temperature using Peltier element or heater. Therefore, parts such as a power source and a temperature controller are unnecessary, and it is possible to largely reduce the cost and size of the arrayed-waveguide grating multiplexer.

Second Embodiment

A second embodiment is the same as the first embodiment except that a gelled polymethyl phenyl siloxane was used as a temperature compensating material. In the present embodiment, vinyl terminal polymethyl phenyl siloxane, methyl hydride siloxane and platinum catalyst were charged into the groove and reacted for 30 minutes at 150° C., thereby preparing a temperature compensating material. Substantially the same effect as the first embodiment was confirmed.

Third Embodiment

Figure 13:
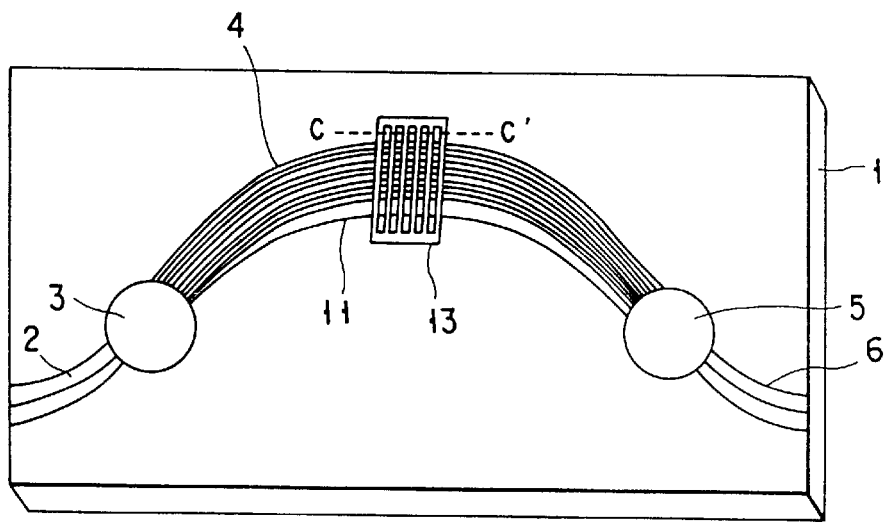
FIG. 13 is a view showing a structure of a temperature independent arrayed-waveguide grating multiplexer according to a third embodiment.
Figure 14:
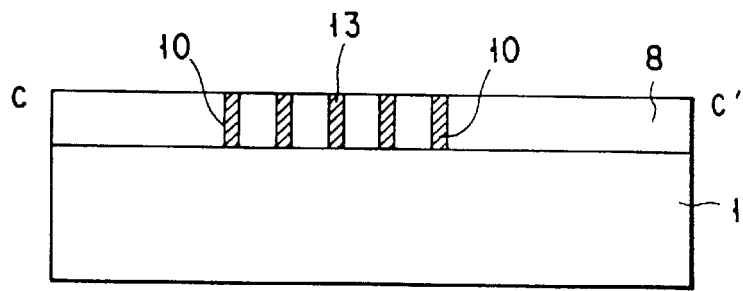
FIG. 14 is an enlarged sectional view taken along the line c–c' in FIG. 12.
Figure 15:
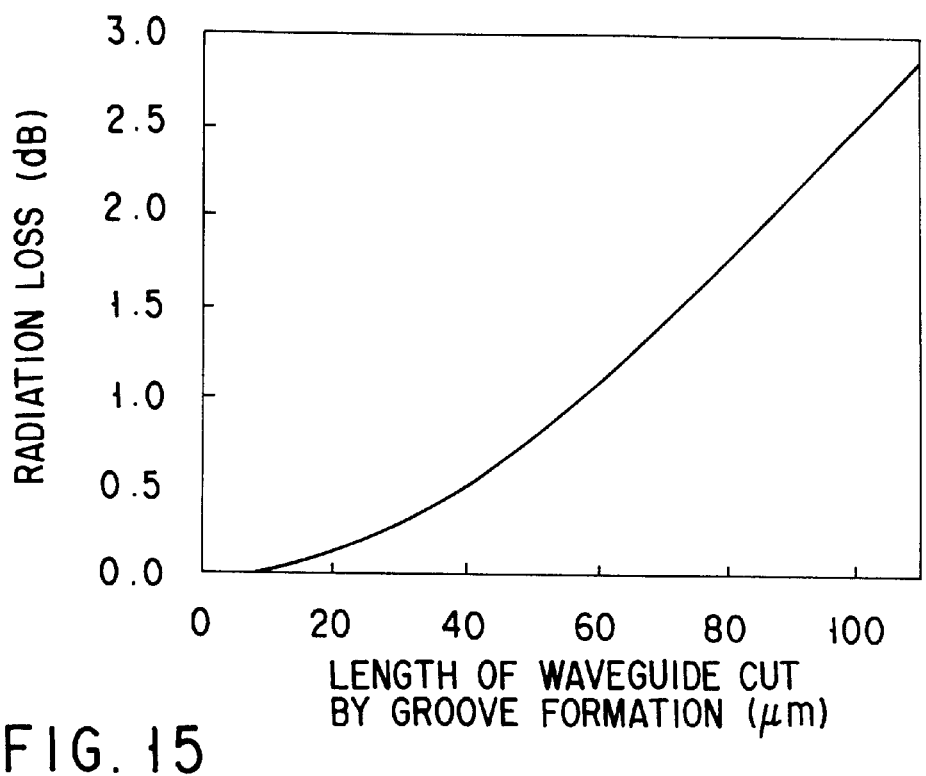
FIG. 15 is a graph showing a relation (calculation result) between a length of waveguide which is cut by a groove and emission loss.
Figure 16:
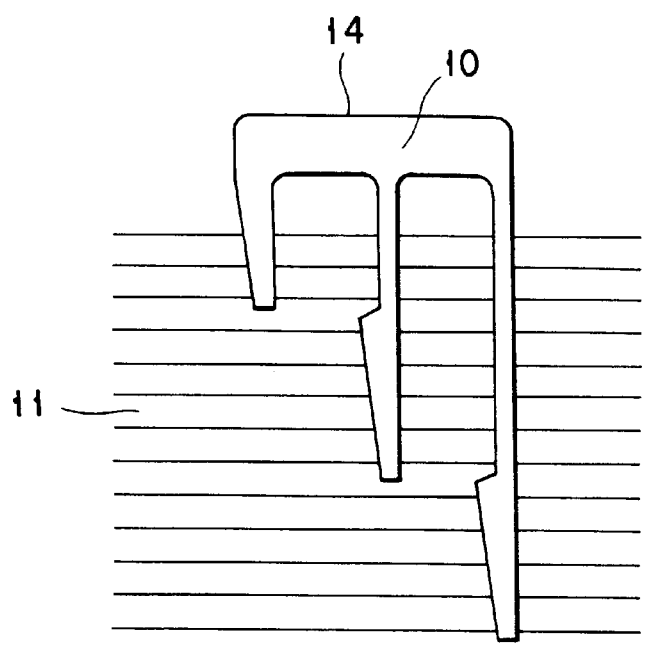
FIG. 16 is an enlarged view of a groove processing part of the arrayed-waveguide in the temperature independent arrayed-waveguide grating multiplexer according to a fourth embodiment.

FIG. 13 shows a temperature independent arrayed-waveguide grating multiplexer according to a third embodiment, and FIG. 14 shows an enlarged sectional view taken along the line c–c' in FIG. 13. The third embodiment differs from the first embodiment in that a plurality of narrow grooves are formed by photolithography and reactive ion etching. As shown in FIG. 15, a radiation loss is abruptly increased with respect to a width of the groove of the present invention, i.e., a length of the cut waveguide. Therefore, a radiation loss when ten grooves of 10 μm width are formed is smaller than a radiation loss when a single groove of 100 μm width is formed.

Thereupon, taking reproduction performance of etching into account, the minimum groove width was set to be 10 μm, and the number of grooves was set five. A length of the cut waveguide is increased by 0.25 μm each. At that time, a radiation loss was 1 dB. As compared with the first embodiment, the radiation loss is reduced down to a half, and the effect of the present invention could be confirmed.

In order to suppress the reflection in a phase boundary between the quartz waveguide and the silicone resin, the angle between the groove 13 and the straight waveguide 11 was inclined in a range of 90 degrees to 5 degrees. As a result, return loss was 40 dB or more.

Further, it was contrived to connect the plurality of grooves, and round the angle at the connected portion, thereby making the flow of silicone resin smooth so that if the resin was dropped once, the resin could be charged into all of the grooves.

Fourth Embodiment

In the fourth embodiment, the shape of the groove of the previous embodiment is formed in such a manner that only a tip end is shaped into wedge-like configuration, and other portions have equal widths.

A design was made on the mask such that in a portion in which a groove width of the tip end is changed (wedge-shaped portion), a length of the waveguide to be cut is stepwisely increased by 1.25 µm each. A width of the right end wedge-like groove is stepwisely varied by 1.25 µm in a range of 8 to 14.25 µm, and a width with respect to the next waveguide is returned to 8 µm, and another groove is added.

By forming the groove into such a shape, a total of lengths of the cut waveguides is stepwisely increased by 1.25 µm, and the longest length of the waveguide to be cut can be 14.25 µm per one portion.

As a result, a total of radiation loss was small value as less as 0.3 dB.

Fifth Embodiment

Figure 17:
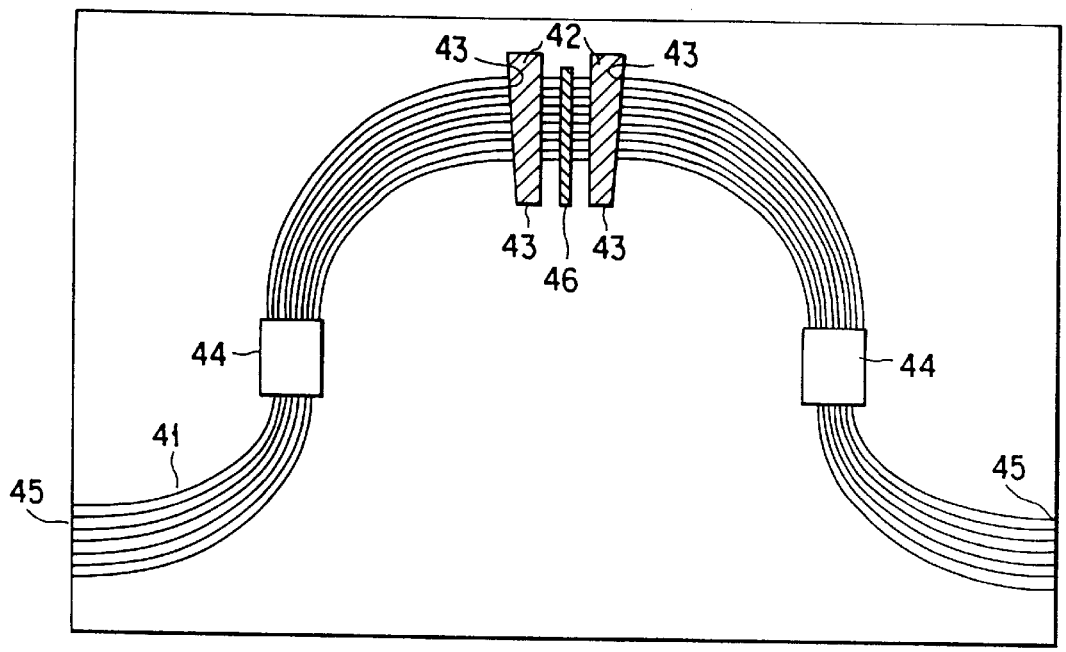
FIG. 17 is a view showing a structure of lightwaveguide circuit according a fifth embodiment of the present invention, and showing a state where a wavelength plate is inserted to an arrayed-waveguide grating.

FIG. 17 shows an arrayed-waveguide grating which is similar to that of the first embodiment, and is the same as in that a ½ wavelength plate 46 whose main axis is inclined through 45 degrees with respect to the substrate is inserted into a central portion. The wavelength plate 46 is made from polyimide thin film, and fixed by adhesive.

As a result, when a light propagated the arrayed-waveguide, its TE mode and TM mode were exchanged and a wavelength grating multiplexer whose λ c does not depend on polarization of input light could be produced. The fact that λ c does not depend on temperature is the same as the first embodiment.

Sixth Embodiment

Figure 18:
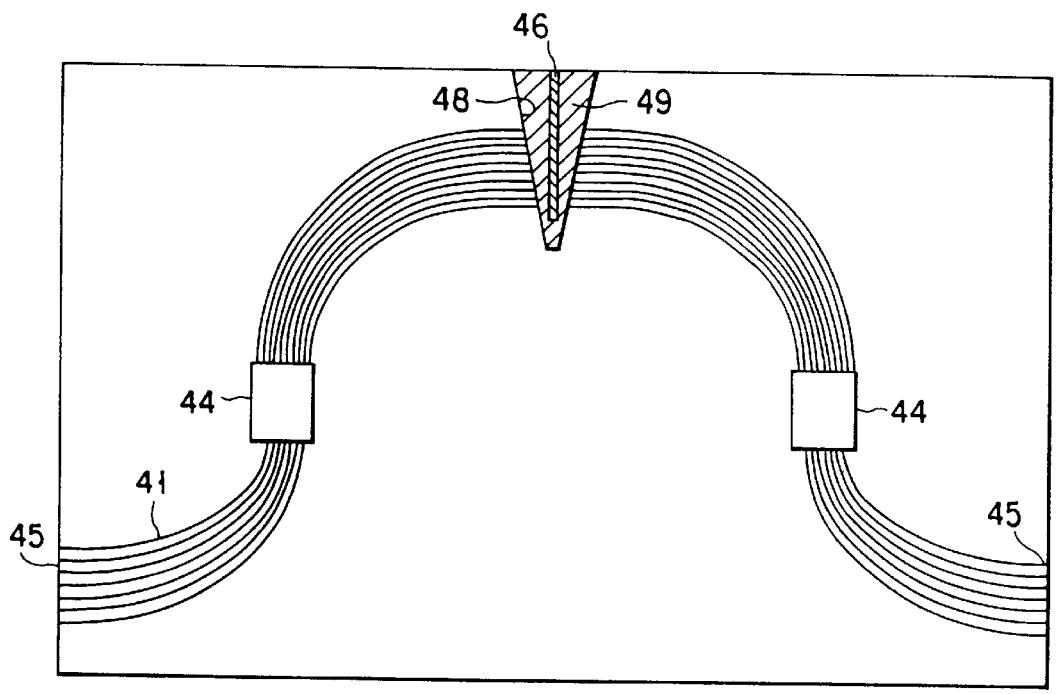
FIG. 18 is a view showing a structure of lightwaveguide circuit according a sixth embodiment of the present invention, and showing a state where a wavelength plate is inserted to an arrayed-waveguide grating.

FIG. 18 is based on the same principle as that of the fifth embodiment, but is different therefrom that a groove 48 in which the temperature compensating material is inserted is formed in a central portion of the arrayed-waveguide, and a silicone resin and a ½ wavelength plate are inserted into the groove 48. The silicone resin exhibits two functions, i.e., a function for making independent of temperature and a function for fixing the wavelength plate, and is used together with the temperature compensating material, which makes it possible to shorten the production process of a temperature independent and polarization independent arrayed-waveguide grating multiplexer.

Seventh Embodiment

Figure 19:
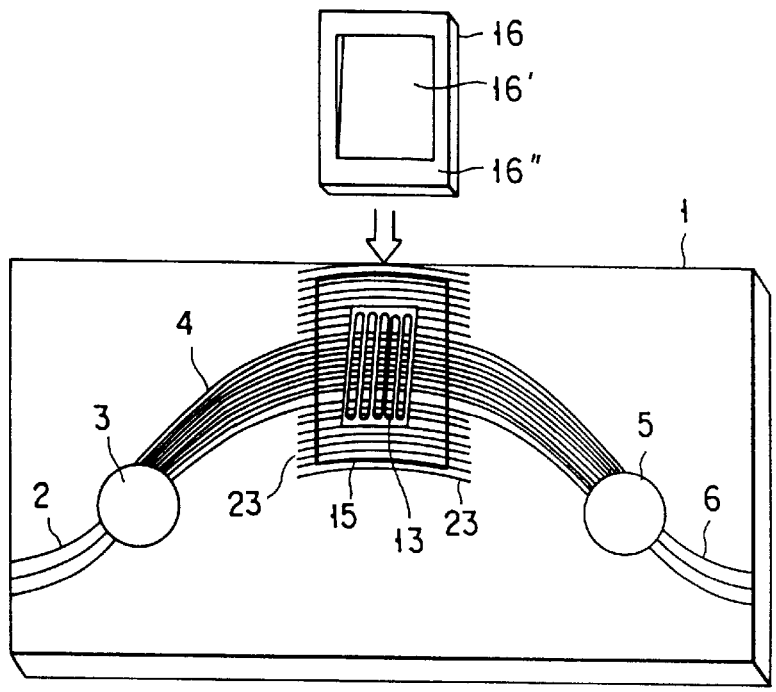
FIG. 19 is a view showing a structure of a temperature independent arrayed-waveguide grating multiplexer (before being airtightly sealed) according to a seventh embodiment of the present invention.
Figure 20:
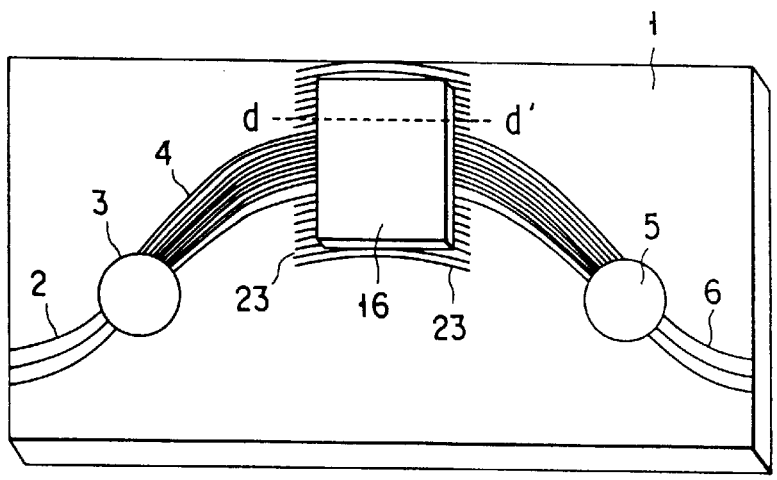
FIG. 20 is a view showing a structure of a temperature independent arrayed-waveguide grating multiplexer (after being airtightly sealed) according to the seventh embodiment of the present invention.
Figure 21:
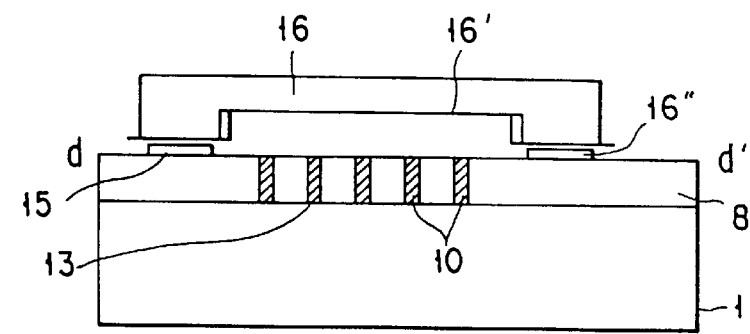
FIG. 21 is an enlarged sectional view taken along the line d–d' in FIG. 20.

FIGS. 19 to 21 show a temperature independent arrayed-waveguide grating multiplexer of a seventh embodiment. A lightwaveguide circuit, a groove shape, and a silicone resin used of the arrayed-waveguide grating multiplexer are the same as those of the third embodiment, bus has a characteristic that the groove 13 and the silicone resin 10 are airtightly sealed by an Si lid 16 disposed on a surface of a sample. This is because that refractive index of the silicone resin is varied depending on the surrounding humidity, and transmission wavelength of the arrayed-waveguide grating multiplexer is prevented from being varied with the variation of the refractive index of the silicone resin. A fixing the lid was made using SnPb solder films 15 and 16". The reason why the SnPb solder films 15 and 16" was used is that it was determined that adhesion could be done at a temperature as low as about 200° C. which is not possible by other welding or AuSn solder, and an influence applied to the silicone resin would be smaller.

Further, the reason why the lid 16 used for airtight sealing was made of Si was that if the same material as that of the lightwaveguide circuit substrate is used, a thermal strain is not generated even if the temperature is varied. The lid 16 was obtained in such a manner that a resist was patterned into a shape of edge of the lid in the Si substrate and then, an inner side thereof was wet-etched with KOH to form a recess 16', and after the resist was removed, SnPb solder was accumulated over the entire inner surface of the Si lid 16 in an amount of about 10 Mm using a vacuum evaporation process. The substrate of the arrayed-waveguide grating multiplexer was formed with an Au film 15 having the same shape as the edge of the lid 16 by the vacuum evaporation process and dry etching. The operation for fixing the lid was carried out in a dry nitrogen atmosphere so that water or moisture does not enter.

Figure 22:
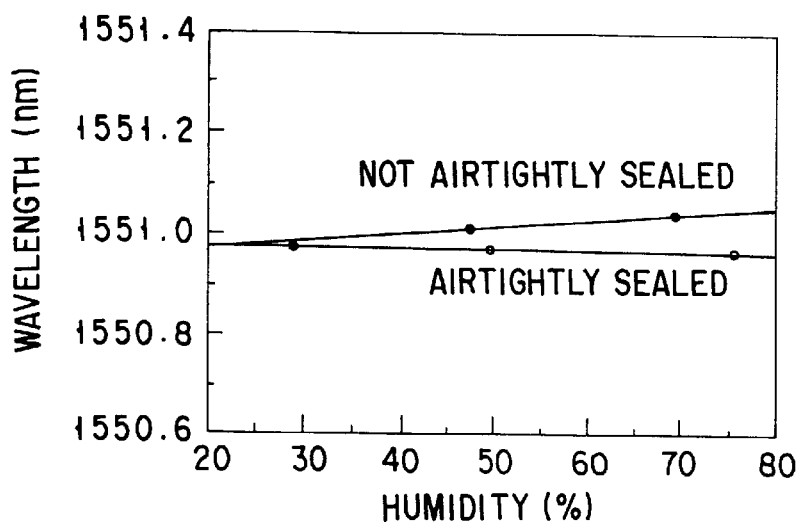
FIG. 22 is a graph showing humidity dependence (measured at 25° C.) of a central wavelength of the temperature independent arrayed-waveguide grating multiplexer according to the seventh embodiment.

FIG. 22 shows a humidity dependency of the transmission wavelength of the arrayed-waveguide grating multiplexer at room temperature before and after the airtight sealing is made. It can be seen that the transmission wavelength is not varied with respect to humidity after airtight seal is made, as compared with a case before the airtight sealing is made.

In the waveguide used in the present invention, cores are embedded in the clad, and in a portion in which there are a large number of cores, the clad surface is about 1 µm higher than a portion in which there is no core. Therefore, a gap of 1 µm is produced between the lid and the clad in some cases. Thereupon, in the present embodiment, a dummy waveguide 23 is disposed in a range wider than the lid 16 so as to uniform the height of the clad surface.

Eighth Embodiment

Figure 23:
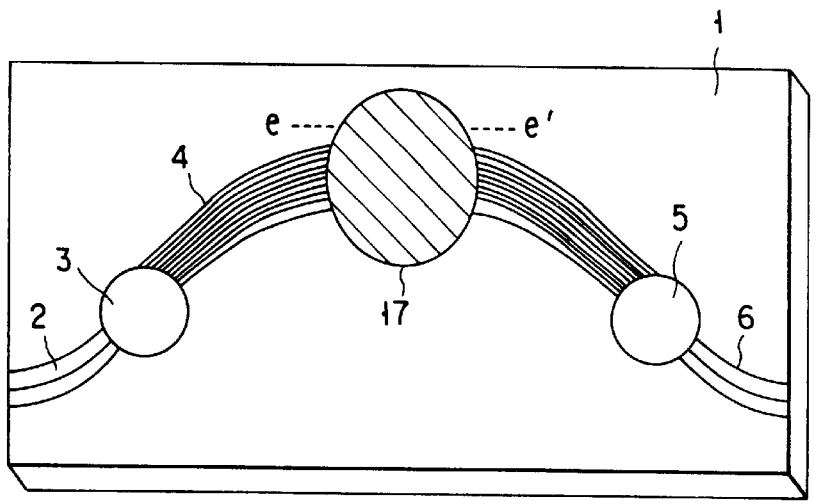
FIG. 23 is a view showing a structure of the temperature independent arrayed-waveguide grating multiplexer (epoxy resin is applied on silicone resin) according to an eighth embodiment of the present invention.
Figure 24:
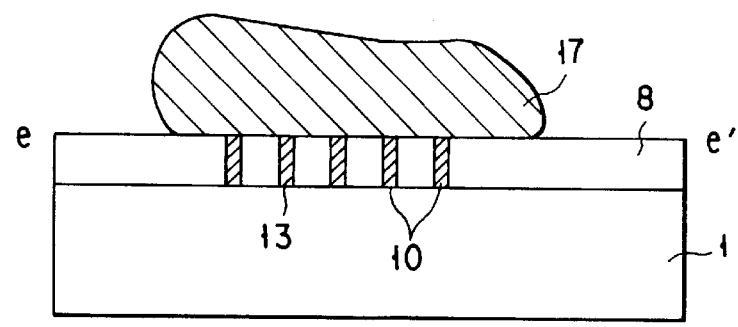
FIG. 24 is an enlarged sectional view taken along the line e–e' in FIG. 23.

FIGS. 23 and 24 show a temperature independent arrayed-waveguide grating multiplexer of the present eighth embodiment. A lightwaveguide circuit structure, a groove, and a silicone resin used to be charged are the same as those of the third embodiment. The difference is that after the silicone resin 10 is charged into the groove 13, the groove 13 and the silicone resin 10 are covered with epoxy-based resin 17. Epoxy-based resin has a lower transmission ratio of humidity, and has an effect to protect the silicone resin against humidity as the lid in the seventh embodiment. Further, as compared with the previous embodiment, there are merits that material cost is extremely low and manufacture is easy.

Properties with respect to humidity of the temperature independent arrayed-waveguide grating multiplexer of the present embodiment was the same as that of the seventh embodiment.

Ninth Embodiment

A temperature independent arrayed-waveguide grating multiplexer of the present invention is extremely effective for reducing the cost of the grating multiplexer because a temperature control is unnecessary. However, the transmission wavelengths are varied in a range of about ±0.05 nm for every sample :due to fluctuation of effective refractive index of waveguide. In the conventional temperature dependent arrayed-waveguide grating multiplexer, the transmission wavelength could be adjusted by varying the set temperature in a range of about ±0.05 nm. However, in the arrayed-waveguide grating multiplexer of the present invention, since the transmission wavelength does not depend on temperature, the transmission wavelength can not be adjusted by varying the set temperature as in the conventional manner.

Figure 25:
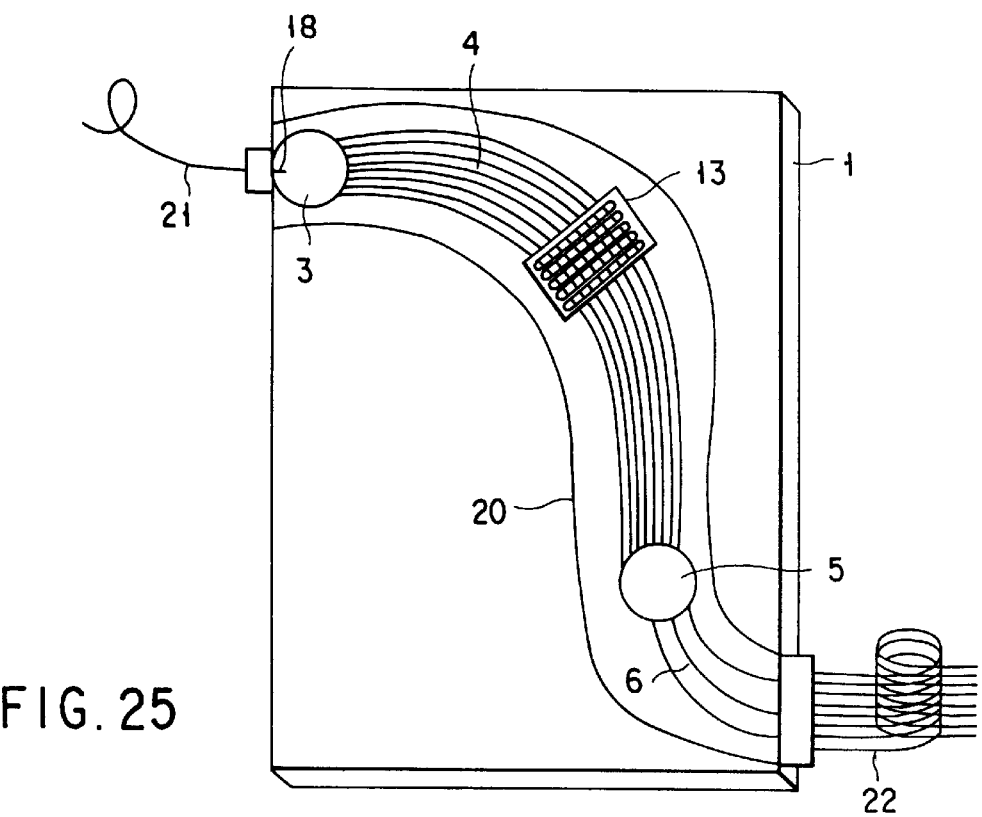
FIG. 25 is a view showing a structure of the temperature independent arrayed-waveguide grating multiplexer (an input fiber is connected to an end of a first slab waveguide) according to a ninth embodiment of the present invention.

In the present embodiment, in order to overcome this problem as shown in FIG. 25, the input light from the input fiber 21 is directly radiated to the first slab waveguide 3, and a position of the input fiber is moved in a direction parallel to the end surface of the substrate, thereby adjusting the transmission wavelength.

First, the arrayed-waveguide grating multiplexer is cut at the end surface of the first slab waveguide 3 and polished. Next, a marker 18 is placed on the input fiber 21, and an approximate connection position of the input fiber 21 is determined using this marker 18.

Here, a light having a wavelength which is desired to pass through is input, and a connection position of the input fiber 21 is determined such that the output from the output fiber 22 becomes maximum. In this state, the input fiber 21 is fixed to the substrate 1 using a ultraviolet curing resin. According to this method, a 1×N arrayed-waveguide grating multiplexer in which the transmission wavelength is suppressed to a desired value could be realized.

In the drawings, the reference number 20 denotes a monitor waveguide.

Tenth Embodiment

Figure 26:
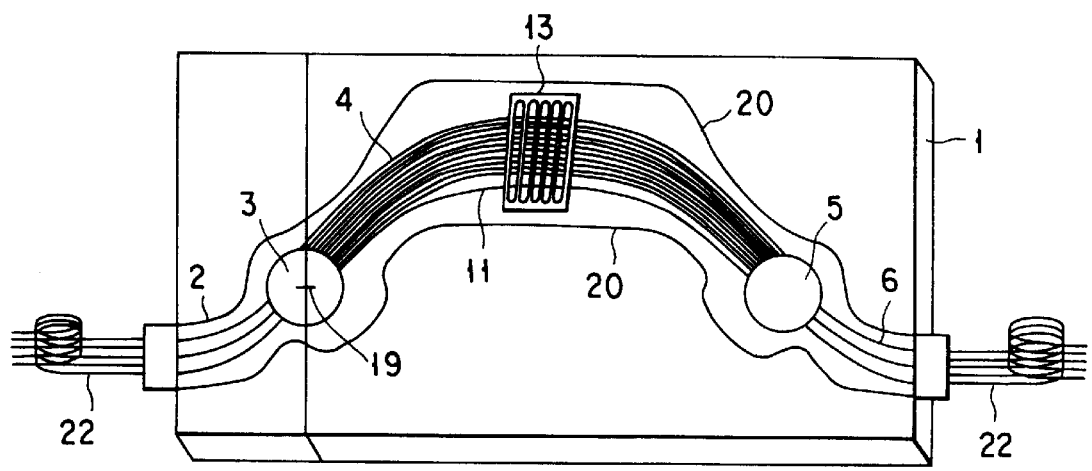
FIG. 26 is a view showing a structure of the temperature independent arrayed-waveguide grating multiplexer (the arrayed-waveguide grating multiplexer is separated from or connected to the first slab waveguide) according to a tenth embodiment of the present invention.

FIG. 26 shows a temperature independent arrayed-waveguide grating multiplexer of the present tenth embodiment. A lightwaveguide circuit structure, a groove, a silicone resin to be charged and the like are the same as those of the third embodiment. The difference is that the substrate 1 is separated into two along a straight line passing the first slab waveguide 3.

A producing procedure will be described. When a formation of the groove 13 by the reactive ion-etching is completed, the substrate is cut into two in front and rear of the first slab waveguide 3. After the silicone resin is charged into the groove 13, the input fiber array 22 and the input waveguide 2 are connected, and the output fiber array 22 and the output waveguide 6 are connected using a monitor waveguides 20 disposed at opposite sides of the arrayed-waveguide grating multiplexer.

Next, as a mark a marker line 19 which was connected before cutting, the position of the substrate is adjusted. Subsequently, two substrates turns horizontally such that a loss of each of the two monitor waveguides 20 becomes minimum. Here, the monitor waveguides 20 disposed on the opposite sides of the arrayed-waveguide grating multiplexer are designed to form a right angle with respect to the cut surface as shown in FIG. 26. Lastly, inputting a light having a wavelength which is desired to transmit e.g., from the fourth input fiber to the fourth output fiber, a relative position of the samples are determined such that the light transmitting from the fourth input fiber to the fourth output fiber becomes strongest, and the two substrates are fixed using a ultraviolet curing resin.

The basic conception of the present embodiment is the same as the ninth embodiment, but is different therefrom in that an arrayed-waveguide grating multiplexer having a plurality input ports can also be realized in the present embodiment.

Eleventh Embodiment

Figure 27:
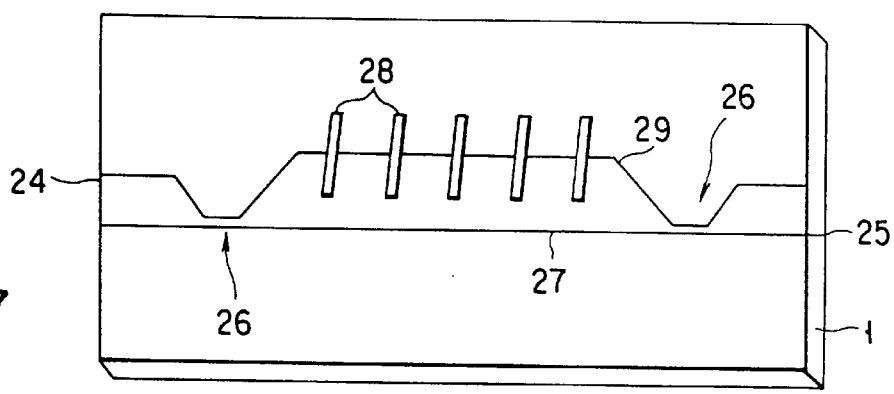
FIG. 27 is a view showing a structure of a temperature independent Mach Zehnder interferometer grating multiplexer according to an eleventh embodiment of the present invention.
Figure 28:
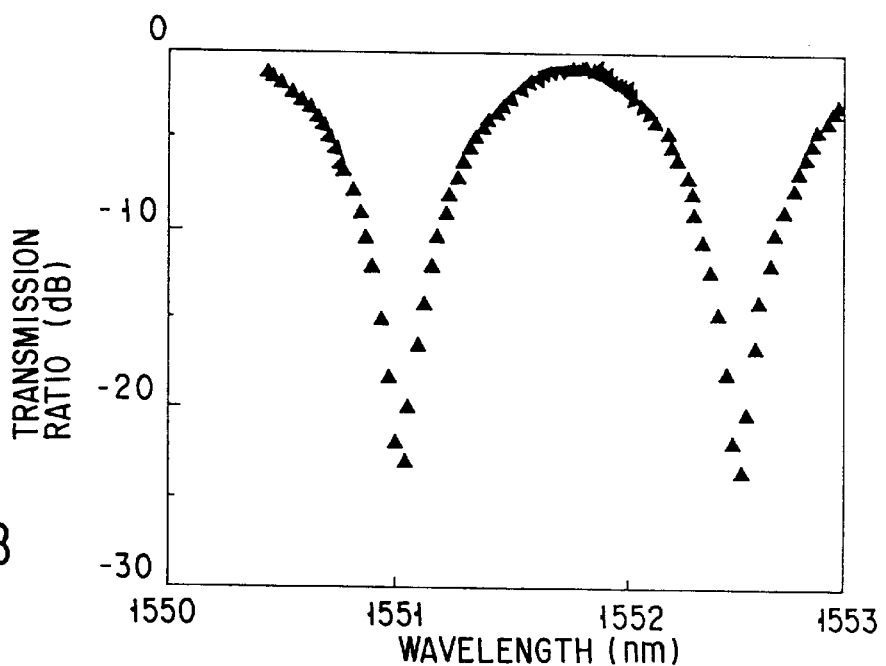
FIG. 28 is a graph showing a transmittance spectrum of the temperature independent Mach Zehnder interferometer type grating multiplexer according to the eleventh embodiment of the invention.
Figure 29:
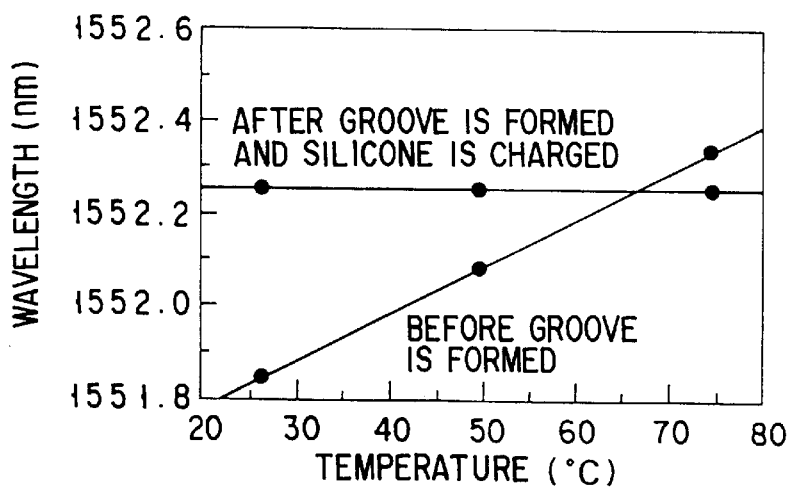
FIG. 29 is a graph showing a variation in temperature dependence of a transmission wavelength before and after a groove is formed and silicone resin is charged in the Mach Zehnder interferometer type grating multiplexer according to the eleventh embodiment of the invention.

FIG. 27 shows a temperature independent grating multiplexer of an eleventh embodiment. The grating multiplexer of the present embodiment is different from those in the first to tenth embodiment, and is of a Mach Zehnder interferometer type. A principle for making into temperature independent type is basically the same as that in the arrayed-waveguide grating multiplexer. A difference in length between two arm waveguides 27 and 29 of the Mach Zehnder interferometer of the present invention is 1 mm, and FSR is 1.6 nm. The longer arm waveguide 29 was formed with five grooves 28 each having a width of 7 μm. Further, a silicone resin was charged into each of the grooves 28. FIG. 28 shows a transmittance spectrum from the input port 24 to the output port 25. FIG. 29 shows a result of comparison of the temperature dependency of a wavelength in which the transmission ratio loss becomes highest before and after the grooves are formed and the silicone resin is charged. From FIG. 29, it can be seen that the transmission wavelength characteristic does not depend on temperature. In the drawings, the reference number 26 denotes a directional coupler.

Twelfth Embodiment

The present twelfth embodiment relates to an alignment method when an input fiber 21 is connected to the slab waveguide 3 in a temperature independent arrayed-waveguide grating multiplexer shown in FIG. 25. In the ninth embodiment, it is described that light of service waveguide is radiated from the input fiber 21, and a position of the input fiber is adjusted such that an amount of light transmitted, e.g., to the fourth output port becomes maximum, thereby making an alignment of the input fiber 21. It is certain that the method in the ninth embodiment is the simplest method when the transmittance spectrum of the arrayed-waveguide grating multiplexer is of a waveform as shown in FIG. 11, and a full width at half maximum (FWHM) thereof is sufficiently small with respect to the channel interval.

Figure 30:
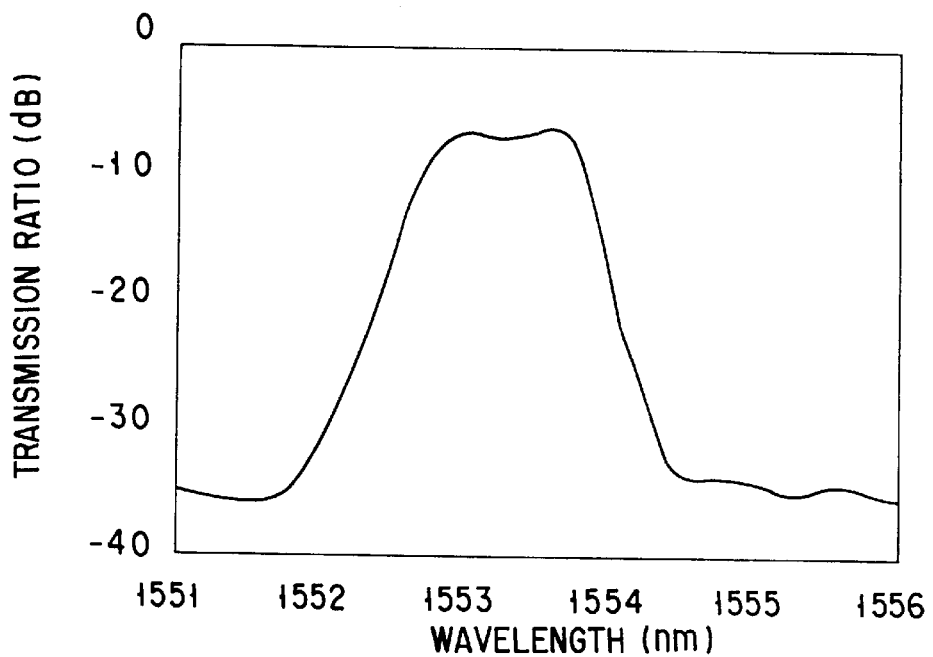
FIG. 30 is a graph showing one example of a transmittance spectrum of the arrayed-waveguide grating multiplexer according to a twelfth embodiment.

However, when the FWHM is relatively wide, or when the transmittance spectrum is of waveform as shown in FIG. 30, the wavelength having the largest transmission ratio is not necessarily a center of the transmission ratio region.

In order to solve this problem, in the present embodiment, a spontaneous emission (ASE) light of a fiber amplifier having a wide wavelength component as an illuminant is radiated from the input fiber 21 to the slab waveguide 3, and as to a direction perpendicular to the substrate, a position of the input fiber is determined such that a transmission light to the fourth output port for example becomes maximum. As to a direction parallel to the substrate, transmittance spectrum to the fourth output port for example is measured by a spectrum analyzer, and the input fiber 21 is aligned such that the center of the transmission ratio region becomes equal to the desired wavelength, and fixed by adhesive.

By using this method, even if the shape of the transmittance spectrum is not a single angle shape as in FIG. 11, it is possible to always align the transmission wave length of the arrayed-waveguide grating multiplexer to a desired wavelength. The alignment method of the present embodiment can be applied to the tenth embodiment shown in FIG. 26.

Thirteenth Embodiment

Figure 31:
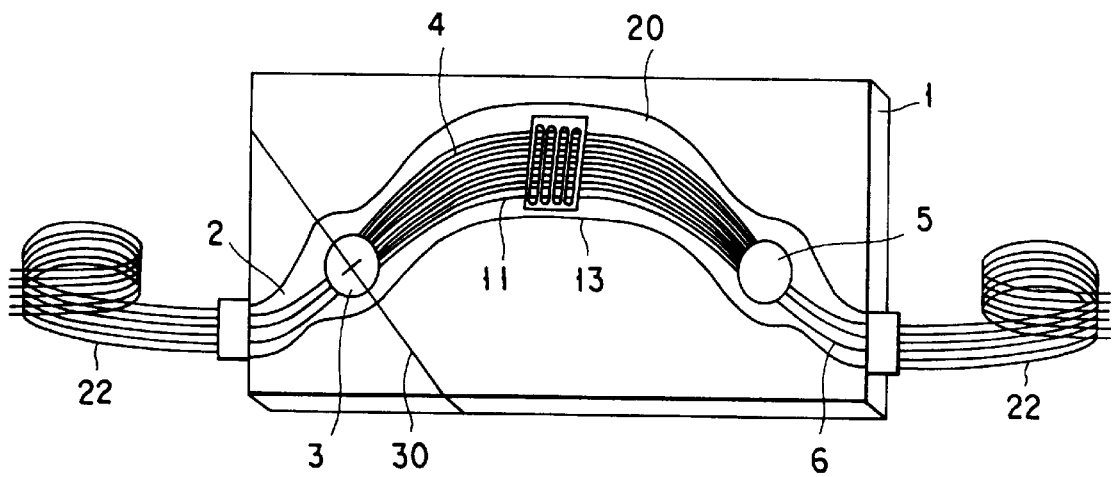
FIG. 31 is a view showing a structure of the temperature independent arrayed-waveguide grating multiplexer according to a thirteenth embodiment.

FIG. 31 shows a temperature independent arrayed-waveguide grating multiplexer thirteenth embodiment. A structure of the thirteenth embodiment is the same as that of the tenth embodiment (FIG. 26), but a position to cut the substrate is different therefrom. In the case of FIG. 26, if the relative position of the two substrates is varied, a distance between the input waveguide and the arrayed-waveguide, that is, a focus distance of the input side optical system is deviated. In order to prevent this, as shown in FIG. 31 in the present embodiment, a cutting line 30 is set perpendicular to a line connecting the input waveguide 2 and the arrayed-waveguide 4.

With this arrangement, even if the relative position of the two substrates is varied to set the transmission wavelength to a desired value, it is possible to keep the focus distance at the designed value.

Fourteenth Embodiment

Figure 32:
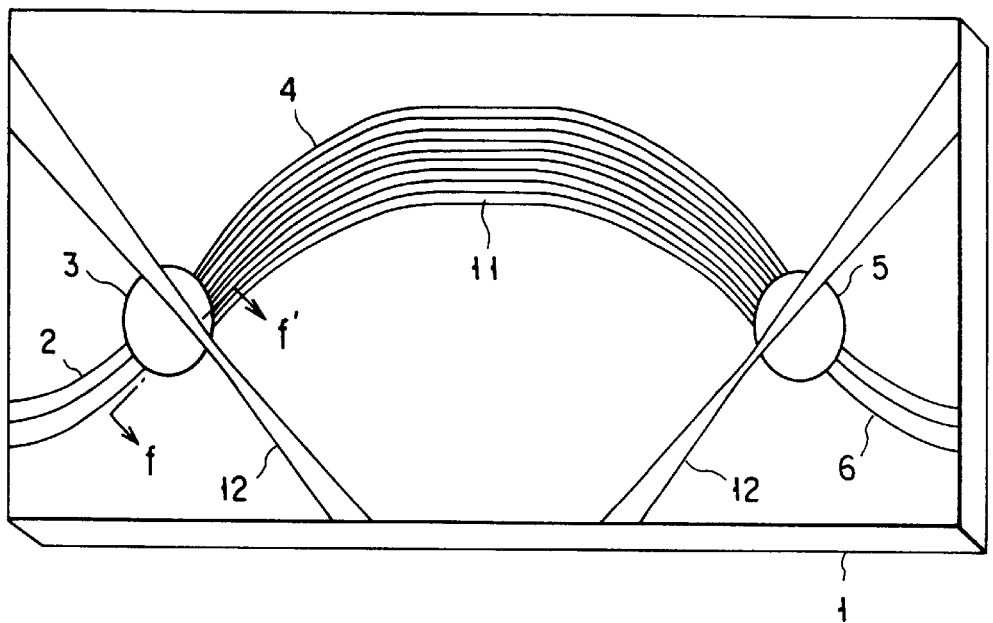
FIG. 32 is a view showing a structure of the temperature independent arrayed-waveguide grating multiplexer according to a fourteenth embodiment.
Figure 33:
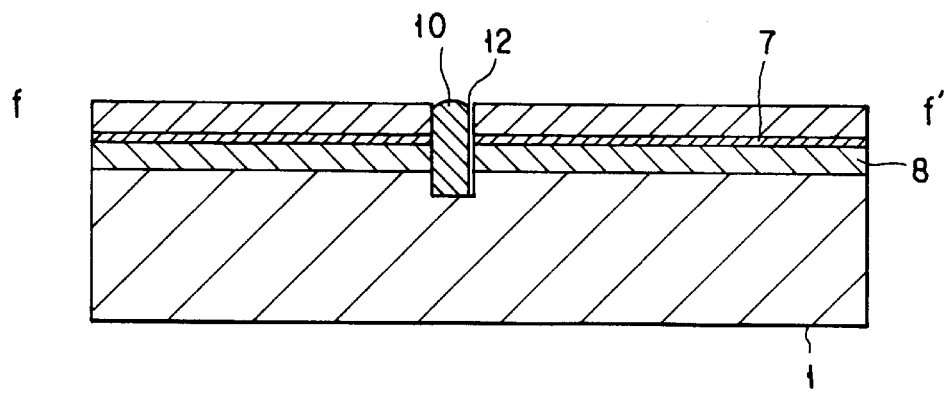
FIG. 33 is an enlarged sectional view taken along the line f–f' line in FIG. 32.

FIG. 32 shows the temperature independent arrayed-waveguide grating multiplexer of the present fourteenth embodiment, and FIG. 33 shows a sectional view taken along the line f–f' in FIG. 32. A lightwaveguide circuit structure and a silicone resin to be charged are the same as those in the first embodiment. The present embodiment is different from the first embodiment (FIG. 8) only in that the groove 12 crosses the first slab waveguide 3 or the second slab waveguide 5. The temperature independent effect of the present embodiment is the same as that of the first embodiment, but the radiation loss in the groove 12 of the present embodiment is smaller than that of the first embodiment.

Fifteenth Embodiment

Figure 34:
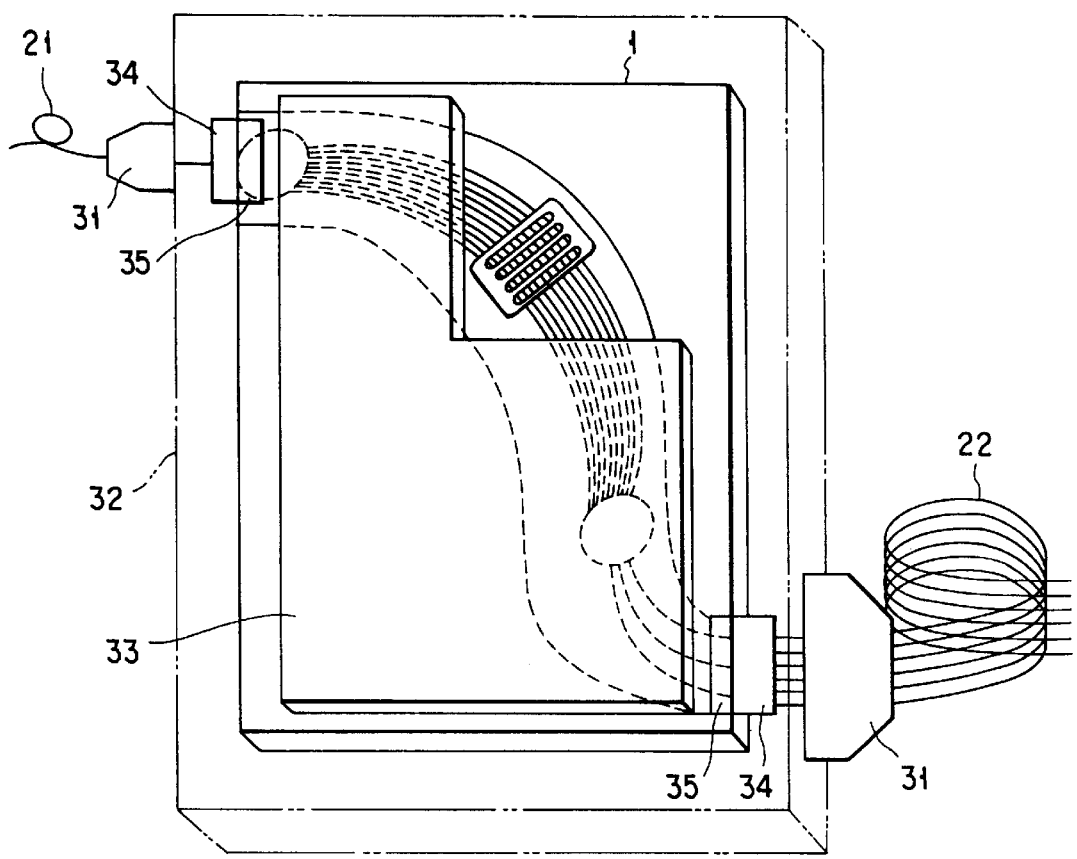
FIG. 34 is a schematic view showing an outline of a temperature independent arrayed-waveguide grating multiplexer module according to a fifteenth embodiment.
Figure 35:
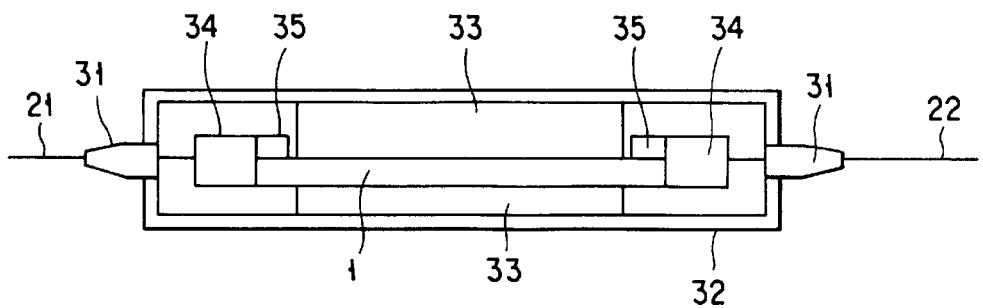
FIG. 35 is a side view of the temperature independent arrayed-waveguide grating multiplexer module according to the fifteenth embodiment.

FIG. 34 shows a temperature independent arrayed-waveguide grating multiplexer module of the present fifteenth embodiment, and FIG. 35 shows a side view thereof. The lightwaveguide circuit and input and output fibers in the present embodiment are the same as those in the ninth embodiment.

Figure 36:
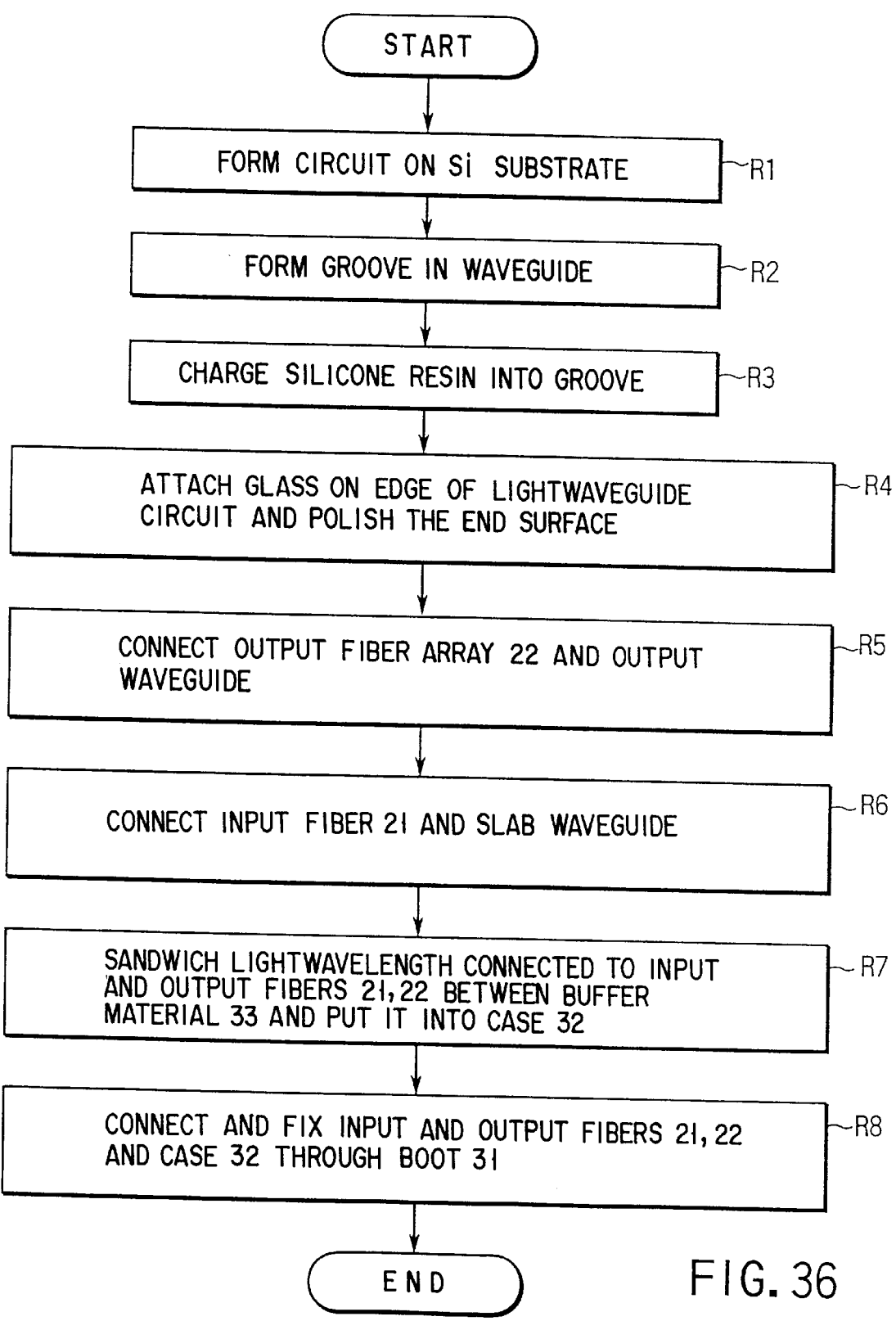
FIG. 36 is a flowchart for showing manufacturing procedure of a temperature independent arrayed-waveguide grating multiplexer according to the fifteenth embodiment.

Producing procedures of the temperature independent arrayed-waveguide grating multiplexer module will be explained using FIG. 36.

Step R1: A lightwaveguide circuit shown in FIG. 34 is formed on a silicon substrate.

Step R2: A predetermined groove is formed in the arrayed-waveguide by etching.

Step R3: A silicone resin is charged into the groove.

Step R4: A fiber connection reinforcing glass 35 is attached to an edge of the lightwaveguide circuit, and the end surface is polished.

Step R5: An output fiber array 22 fixed to a glass block 34 and the output waveguide are connected.

Step R6: A position of the input fiber is determined, and the input fiber 21 is connected to slab waveguide using the method shown in ninth embodiment. The input fiber is supported by the glass block 34.

Step R7: A lightwaveguide circuit connecting the input and output fiber 21 and 22 is sandwiched by a buffer material 33 and is put into a plastic case 32.

Step R8: The input and output fibers 21 and 22 and the plastic case 32 are adhered and fixed through a boot 31.

The temperature independent arrayed-waveguide grating multiplexer module shown in FIG. 34 is completed through the above described steps. According to the conventional arrayed-waveguide grating multiplexer, if the temperature thereof is varied, the transmission wavelength is also varied and therefore, it was necessary to control the temperature. For this reason, it was necessary to closely contact the substrate with a Peltier element or heater.

However, in the present invention, the because transmission wavelength does not depend on the temperature, it is unnecessary to fix the substrate to the Peltier element or heater, and as shown in FIG. 35, it is sufficient to hold the substrate through the resilient buffer material (cushion material).

Further, in the module of the present embodiment, the fiber is fixed to the boot so that a forth generated when the input and output fibers are unintentionally pulled, is not transmitted to the connection portion with the lightwaveguide circuit.

With the above-described features, the waveguide grating multiplexer module could be realized which can endure the actual utility environment where the temperature is varied, a vibration is generated from outside and tensile strength is applied to the fibers and the like.

Sixteenth Embodiment

Figure 37A:
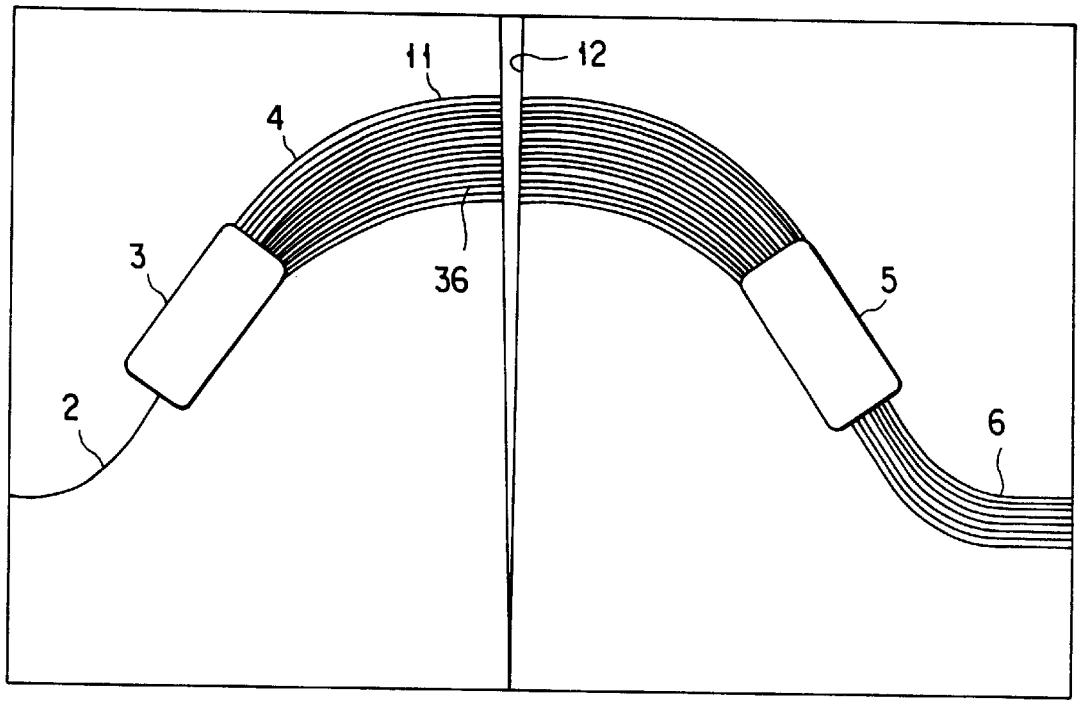
Figure 37B:
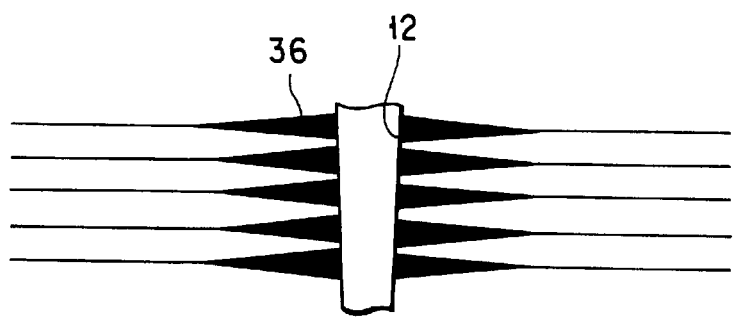

FIGS. 37A and 37B show a temperature independent arrayed-waveguide grating multiplexer according to a sixteenth embodiment of the present invention. The basic conception of the present embodiment is the same as that of the first embodiment in that the groove 12 is formed in the arrayed-waveguide 4, and the silicone material is charged. A waveguide having a difference of the specific refractive index of 0.75% was used. A radius of curvature of the curved portion of the waveguide can be smaller as compared with a case in which the difference of specific refractive index is 0.45% as described above, and therefore, there is a merit that a AWG can be designed smaller in size. However, there is undesirable possibility that a beam of a waveguide mode size is small and a radiation loss in the groove becomes greater.

Thereupon, as shown in FIG. 37B, a width of that portions of the waveguide which cross the groove 12 is increased. Portions 36 whose widths are gradually varied serve as beam collimator, and exhibits effects that diffraction when a light propagates in the groove having not waveguide structure is reduced, and a radiation loss when the light crosses the groove is reduced. As a result of experiment using a test waveguide, it was confirmed that when a width of the groove was 150 μm and the beam collimator 36 is not used, the radiation loss was 5.4 dB, but when the beam collimator 36 was added, the radiation loss was 2.8 dB, and the radiation loss could be greatly reduced. When the groove is formed using a dicing saw which is simpler than using photolithography and dry etching, a width of the groove is increased, but even in such a case, it is possible to manufacture a small sized temperature independent arrayed-waveguide grating multiplexer having a small radiation loss in the groove, if the present embodiment is used.

Seventeenth Embodiment

Figure 38A:
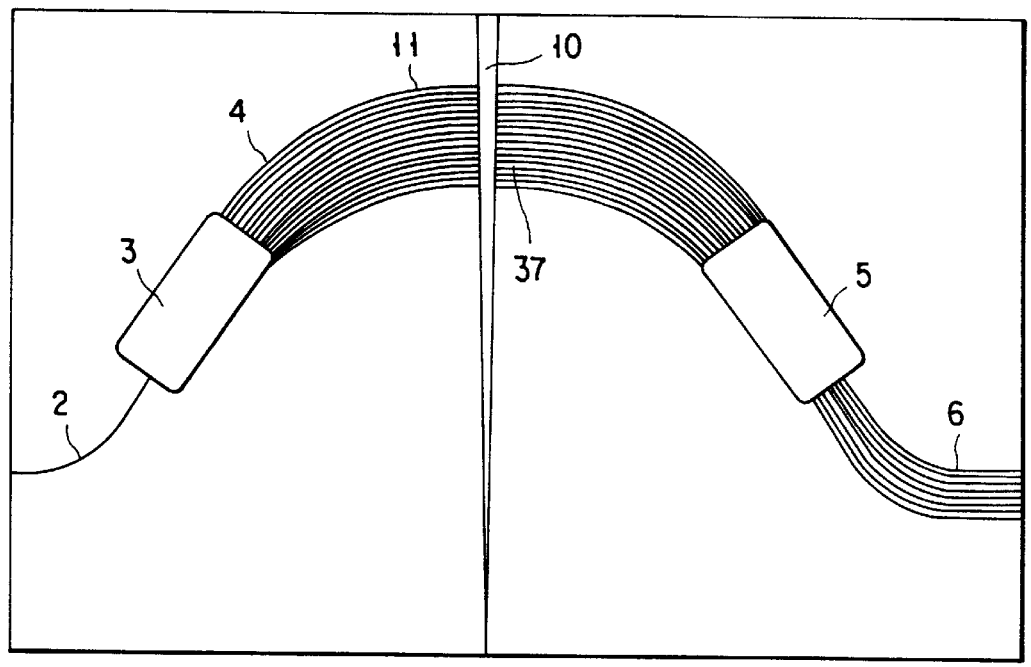
Figure 38B:
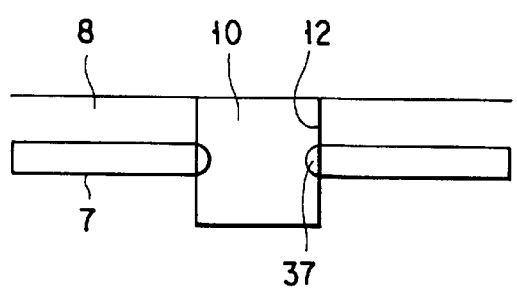

FIG. 38A shows a temperature independent arrayed-waveguide grating multiplexer of the present seventeenth embodiment of the invention, and FIG. 38B shows a sectional view in the vicinity of the groove 12. In the present embodiment, a difference of specific refractive index of the waveguide was set to 0.75% as in the sixteenth embodiment, but each of opposed an end surfaces of waveguides with the groove 12 interposed therebetween is provided with a function as a lens by forming a curved surface. In this case, the silicone resin 10 in the groove has a refractive index smaller than that of the waveguide core 7 and therefore, a convex curved surface is formed for providing a function of a lens.

First, the core is projected in an amount of 5 μm from the convex waveguide end 37 by utilizing the fact that the etching speed of the clad 8 is faster than that of the core 7 in wet etching using buffer fluoride acid. Then, the core was heated at 1300° C. to form the lens shape by a phenomenon that the core glass is melted and is rounded by surface tension. As a result, a radiation loss when the groove width was 150 μm was reduced down to 2.1 dB, and it was possible to realize a temperature independent arrayed-waveguide grating multiplexer having a low radiation loss. When the refractive index of the temperature compensating material is higher than that of the waveguide, a different etching liquid may be used to dent the core portion to form a concave lens.

Industrial Applicability

As described in detailed above, the lightwaveguide circuit (temperature independent grating multiplexer) of the present invention unnecessitates a temperature control which was used to be necessary to stabilize the transmission wavelength characteristic. Therefore, a Peltier element or a heater, a control sensor for controlling them and a power source can be omitted. Because of these features, it is possible not only to reduce the cost and a size of the grating multiplexer, but also to unnecessitate an electric consumption which was always necessary in the prior art. It is believed that these effects greatly contribute to a development of the lightwaveguide multiplex communication system.

What is claimed is:

1. A lightwaveguide circuit including a plurality of waveguides of different lengths, wherein each of said waveguides comprises a lower clad, a core and an upper clad, each of said waveguides has at least one groove formed by removing said upper clad and said core from said waveguides, and a groove formed by removing said upper clad, said core and said lower clad from said waveguides, said grooves provided with a material having a temperature coefficient of a refractive index different from a temperature coefficient of an effective refractive index of said waveguides, and wherein adjacent waveguides satisfy the equation $$(L1-L2) \times (dn1/dT) = (L2'-L1') \times (dn2/dT)$$

where L1' denotes the sum in lengths of said grooves of one waveguide of said plurality of waveguides, L2' denotes the sum of lengths of said grooves of another waveguide adjacent said one waveguide, L1 denotes lengths of said one waveguide which remained without said L1', L2 denotes lengths of said another waveguide which remained without said L2', dn1/dT denotes said temperature coefficient of said effective refractive index of said waveguides, and dn2/dT denotes said temperature coefficient of said effective refractive index of said material.

2. A lightwaveguide circuit according to claim 1, wherein each of said lower clad, said core and said upper clad is made of quartz glass.

3. A lightwaveguide circuit according to claim 1 or 2, further including beam collimator waveguides at each of opposed ends of said grooves.

4. A lightwaveguide circuit according to claim 1 or 2, further including an arrayed-waveguide comprising said plurality of waveguides, each of said waveguides having a length which is sequentially increased by a predetermined length, and a slab waveguide being connected to opposed ends of said arrayed-waveguide.

5. A lightwaveguide circuit including an arrayed-waveguide comprising waveguides each having a length which is sequentially increased by a predetermined length, and a slab waveguide connected to opposed ends of said arrayed-waveguide, wherein each of said arrayed-waveguide and said slab waveguide comprises a lower clad, a core and an upper clad, said slab waveguide has at least one groove crossed in said slab waveguide, said groove formed by removing said upper clad and said core from said slab waveguide, and said groove formed by removing said upper clad, said core and said lower clad from said slab waveguide, at least one of said grooves has a width which is sequentially increased from one end of said groove toward another end of said groove by a predetermined width, and said grooves are provided with a material having a temperature coefficient of a refractive index different from a temperature coefficient of an effective refractive index of said slab waveguide.

6. A lightwaveguide circuit according to claim 1, 2, or 5, wherein an absolute value of a temperature coefficient of a refractive index of said material provided at said groove is equal to or greater than 20 times of an absolute value of a temperature coefficient of an effective refractive index of said waveguides.

7. A lightwaveguide circuit according to claim 1, 2, or 5, wherein said groove crosses said waveguides at an angle of 80 to 85 degrees.

8. A lightwaveguide circuit according to claim 1, 2, or 5, wherein said plurality of grooves are connected to one another.

9. A lightwaveguide circuit according to claim 1, 2, or 5, wherein an angle of said groove is rounded.

10. A lightwaveguide circuit according to claim 1, 2, or 5, wherein said material is polysiloxane or a cross-linker of polysiloxane.

11. A lightwaveguide circuit according to claim 1, 2, or 5, wherein said material includes polyolefin having at least one of OH group, thiol group, carbonyl group and halogen group at its terminal end.

12. A lightwaveguide circuit according to claim 1, 2, or 5, further including at least one lid airtightly sealing a region provided at said grooves.

13. A lightwaveguide circuit according to claim 12, wherein instead of said lid, said groove and material charged into said groove are covered with a material which is different from said material charged into said groove.

14. A lightwaveguide circuit according to claim 4, further including an optical fiber connected to a predetermined position of an end of said slab waveguide.

15. A lightwaveguide circuit according to claim 4, wherein said slab waveguide have a connection portion which has been aligned and fixed by relative positions of end faces of first and second slab waveguide elements to be connected to each other and form said slab waveguide.

16. A lightwaveguide circuit according to claim 15, wherein a boundary line between said connected two lightwaveguide circuits is passed through a first slab waveguide and is substantially perpendicular to a line connecting an input waveguide and said arrayed-waveguide, or is passed through a second slab waveguide and is substantially perpendicular to a line connecting an output waveguide and said arrayed-waveguide.

17. A lightwaveguide circuit module comprising at least one input fiber and at least one output fiber, as well as a lightwaveguide circuit according to claim 4, a boot, a case and a buffer material, wherein said input and output fibers are connected and fixed to an end surface of said lightwaveguide circuit, said input and output fibers are fixed to said boot, said boot is fixed to said case, and said buffer material is provided at said case.

18. A lightwaveguide circuit according to claim 1 or 2, wherein lenses are each of opposed an end surfaces of said waveguides with said groove interposed therebetween.

19. A lightwaveguide circuit according to claim 1 or 2, wherein said groove has a shape as a manner that only a tip end is shaped into wedgelike configuration and other portions have equal width.

20. A lightwaveguide circuit including a plurality of waveguides of different lengths, wherein
   each of said waveguides comprises a lower clad, a core and an upper clad,
   each of said waveguides has at least one groove formed by removing said upper clad and said core from said waveguides, and a groove formed by removing said upper clad, said core and said lower clad from said waveguide, said grooves have a shape as a manner that only a tip end is shaped into a wedge-like configuration and other portions have equal width, and said grooves provided with a material having a temperature coefficient of a refractive index different from a temperature coefficient of an effective refractive index of said waveguide, and
   wherein adjacent waveguides satisfy the equation $$(L1-L2) \times (dn1/dT) = (L2'-L1') \times (dn2/dT)$$

where L1' denotes the sum in lengths of said groove of one waveguide of said plurality of waveguides,
   L2' denotes the sum of lengths of said groove of another waveguide adjacent said one waveguide,
   L1 denotes lengths of said one waveguide which remained without said L1',
   L2 denotes lengths of said another waveguide which remained without said L2',
   dn1/dT denotes said temperature coefficient of said effective refractive index of said waveguides, and
   dn2/dT denotes said temperature coefficient of said effective refractive index of said material.

21. A lightwaveguide circuit according to claim 1, 2, or 5, further including a ½ wavelength plate arranged in said circuit.

22. A lightwaveguide circuit according to claim 1, 2, or 5, further including a ½ wavelength plate arranged in said groove.

23. A lightwaveguide circuit according to claim 1, 2, or 5, further including a monitor waveguide arranged in said circuit.

24. A lightwaveguide circuit including first and second arm waveguides having different lengths and a directional coupler connected to opposed ends of said first and second arm waveguides, wherein
   each of said first and second arm waveguides comprises a lower clad, a core and an upper clad,
   said first arm waveguide has at least one groove formed by removing said upper clad and said core from said waveguide, and a groove formed by removing said upper clad, said core and said lower clad from said waveguide, said grooves provided with a material having a temperature coefficient of a refractive index different from a temperature coefficient of an effective refractive index of said arm waveguides, and
   wherein adjacent waveguides satisfy the equation $$(L1-L2) \times (dn1/dT) = (-L1') \times (dn2/dT)$$

where L1' denotes the sum in lengths of said grooves,
   L1 denotes lengths of said first arm waveguide which remained without said L1',
   L2 denotes lengths of said second arm waveguide,
   dn1/dT denotes said temperature coefficient of said effective refractive index of said waveguides, and
   dn2/dT denotes said temperature coefficient of said effective refractive index of said material.

25. A lightwaveguide circuit module comprising at least one input fiber and at least one output fiber, as well as a lightwaveguide circuit according to claim 5, a boot, a case and a buffer material, wherein said input and output fibers are connected and fixed to an end surface of said lightwaveguide circuit, said input and output fibers are fixed to said boot, said boot is fixed to said case, and said buffer material is provided at said case.

26. A lightwaveguide circuit module comprising at least one input fiber and at least one output fiber, as well as a lightwaveguide circuit according to claim 24, a boot, a case and a buffer material, wherein said input and output fibers are connected and fixed to an end surface of said lightwaveguide circuit, said input and output fibers are fixed to said boot, said boot is fixed to said case, and said buffer material is provided at said case.

27. A lightwaveguide circuit according to claim 5, further including an optical fiber connected to a predetermined position of an end of said slab waveguide.

28. A lightwaveguide circuit module according to claim 5, wherein said slab waveguide has a connection portion which have been aligned and fixed by relative positions of end faces of first and second slab waveguide elements to be connected to each other and form said slab waveguide.

* * * * *